US012777182B2

(12) United States Patent
Lu et al.

(10) Patent No.: US 12,777,182 B2
(45) **Date of Patent: *Oct. 27, 2026**

(54) DYNAMIC RANGE HANDLING OF HIGH DIMENSIONAL INVERSE AUTOCORRELATION IN OPTICAL FLOW REFINEMENT

(71) Applicant: GOOGLE LLC, Mountain View, CA (US)

(72) Inventors: Lester Lu, Los Angeles, CA (US); Xiang Li, Saratoga, CA (US); Debargha Mukherjee, Cupertino, CA (US)

(73) Assignee: GOOGLE LLC, Mountain View, CA (US)

( * ) Notice: Subject to any disclaimer, the term of this patent is extended or adjusted under 35 U.S.C. 154(b) by 28 days.

This patent is subject to a terminal disclaimer.

(21) Appl. No.: 18/785,699

(22) Filed: Jul. 26, 2024

(65) Prior Publication Data

US 2025/0039436 A1 Jan. 30, 2025

Related U.S. Application Data

(60) Provisional application No. 63/529,091, filed on Jul. 26, 2023.

(51) Int. Cl.

| | |
|---|---|
| ***H04N 19/513*** | (2014.01) |
| ***H04N 19/139*** | (2014.01) |
| ***H04N 19/176*** | (2014.01) |
| ***H04N 19/196*** | (2014.01) |

(52) U.S. Cl.

CPC ......... *H04N 19/521* (2014.11); *H04N 19/139* (2014.11); *H04N 19/176* (2014.11); *H04N 19/196* (2014.11)

(58) Field of Classification Search

None

See application file for complete search history.

(56) References Cited

U.S. PATENT DOCUMENTS

| | | | | |
|---|---|---|---|---|
| 10,110,914 | B1 * | 10/2018 | Chen | H04N 19/54 |
| 2017/0195685 | A1 * | 7/2017 | Chen | H04N 19/182 |
| 2020/0099947 | A1 * | 3/2020 | Li | H04N 19/46 |
| 2022/0248047 | A1 * | 8/2022 | Chen | H04N 19/52 |
| 2024/0406410 | A1 * | 12/2024 | Kim | H04N 19/119 |

* cited by examiner

*Primary Examiner* — Mohammad J Rahman

(74) *Attorney, Agent, or Firm* — Adam D. Kline

(57) ABSTRACT

Coding including dynamic range handling of high dimensional inverse autocorrelation in optical flow refinement includes obtaining a refinement model from available warped refinement models, wherein the available warped refinement models include a four-parameter scaling refinement model, a three-parameter scaling refinement model, and a four-parameter rotational refinement model, obtaining refined motion vectors using the warped refinement model and previously obtained reference frame data in the absence of data expressly indicating the refined motion vectors in the encoded bitstream, wherein obtaining the refined motion vectors includes using a dynamic range adjusted autocorrelation matrix, generating refined prediction block data using the refined motion vectors, generating reconstructed block data using the refined prediction block data, including the reconstructed block data in reconstructed frame data for the current frame, and outputting the reconstructed frame data.

20 Claims, 10 Drawing Sheets

DYNAMIC RANGE HANDLING OF HIGH DIMENSIONAL INVERSE AUTOCORRELATION IN OPTICAL FLOW REFINEMENT

CROSS-REFERENCE TO RELATED APPLICATION(S)

This application claims priority to and the benefit of U.S. Provisional Application Patent Ser. No. 63/529,091, filed Jul. 26, 2023, the entire disclosure of which is hereby incorporated by reference.

BACKGROUND

Digital images and video can be used, for example, on the internet, for remote business meetings via video conferencing, high-definition video entertainment, video advertisements, or sharing of user-generated content. Due to the large amount of data involved in transferring and processing image and video data, high-performance compression may be advantageous for transmission and storage. Accordingly, it would be advantageous to provide high-resolution image and video transmitted over communications channels having limited bandwidth.

SUMMARY

This application relates to encoding and decoding of image data, video stream data, or both for transmission, storage, or both. Disclosed herein are aspects of systems, methods, and apparatuses for encoding and decoding including dynamic range handling of high dimensional inverse autocorrelation in optical flow refinement.

Variations in these and other aspects will be described in additional detail hereafter.

An aspect is a method for encoding including dynamic range handling of high dimensional inverse autocorrelation in optical flow refinement. Encoding including dynamic range handling of high dimensional inverse autocorrelation in optical flow refinement may include generating reconstructed block data by decoding a current block of a current frame from an encoded bitstream. Decoding the current block may include obtaining a refined prediction block for decoding the current block using bilateral matching. Obtaining the refined prediction block may include obtaining a refinement model from available warped refinement models, wherein the available warped refinement models include a four-parameter scaling refinement model, a three-parameter scaling refinement model, and a four-parameter rotational refinement model, obtaining refined motion vectors using the warped refinement model and previously obtained reference frame data in the absence of data expressly indicating the refined motion vectors in the encoded bitstream, wherein obtaining the refined motion vectors includes using a dynamic range adjusted autocorrelation matrix, and generating refined prediction block data using the refined motion vectors. Decoding the current block may include generating reconstructed block data using the refined prediction block data, including the reconstructed block data in reconstructed frame data for the current frame, and outputting the reconstructed frame data.

An aspect is a method for encoding including dynamic range handling of high dimensional inverse autocorrelation in optical flow refinement. Encoding including dynamic range handling of high dimensional inverse autocorrelation in optical flow refinement may include generating reconstructed block data by decoding a current block of a current frame from an encoded bitstream. Decoding the current block may include obtaining a refined prediction block for decoding the current block using bilateral matching. Obtaining the refined prediction block may include obtaining refined motion vectors for decoding the current block using bilateral matching, wherein obtaining the refined motion vectors includes obtaining the refined motion vectors using a rotational and scaling refinement model and previously obtained reference frame data in the absence of data expressly indicating the refined motion vectors in the encoded bitstream, wherein obtaining the refined motion vectors includes using a dynamic range adjusted autocorrelation matrix, and generating refined prediction block data using the refined motion vectors. Decoding the current block may include generating reconstructed block data using the refined prediction block data, including the reconstructed block data in reconstructed frame data for the current frame, and outputting the reconstructed frame data.

An aspect is a method for encoding including dynamic range handling of high dimensional inverse autocorrelation in optical flow refinement. Encoding including dynamic range handling of high dimensional inverse autocorrelation in optical flow refinement may include generating reconstructed block data by decoding a current block of a current frame from an encoded bitstream. Decoding the current block may include obtaining a refined prediction block for decoding the current block using bilateral matching. Obtaining the refined prediction block may include obtaining a refinement model from available warped refinement models, wherein the available warped refinement models include a four-parameter scaling refinement model, a three-parameter scaling refinement model, a four-parameter rotational refinement model, and a four-parameter rotational and scaling model, obtaining refined motion vectors using the warped refinement model and previously obtained reference frame data in the absence of data expressly indicating the refined motion vectors in the encoded bitstream, wherein obtaining the refined motion vectors includes obtaining a combination of block-based warped motion parameters obtained using the warped refinement model and subblock-based translational motion parameters as the refined motion vectors, wherein obtaining the refined motion vectors includes using a dynamic range adjusted autocorrelation matrix, and generating refined prediction block data for the refined prediction block using the refined motion vectors. Decoding the current block may include generating reconstructed block data using the refined prediction block data, including the reconstructed block data in reconstructed frame data for the current frame, and outputting the reconstructed frame data

BRIEF DESCRIPTION OF THE DRAWINGS

The description herein makes reference to the accompanying drawings wherein like reference numerals refer to like parts throughout the several views unless otherwise noted or otherwise clear from context.

DETAILED DESCRIPTION

Figure 1:
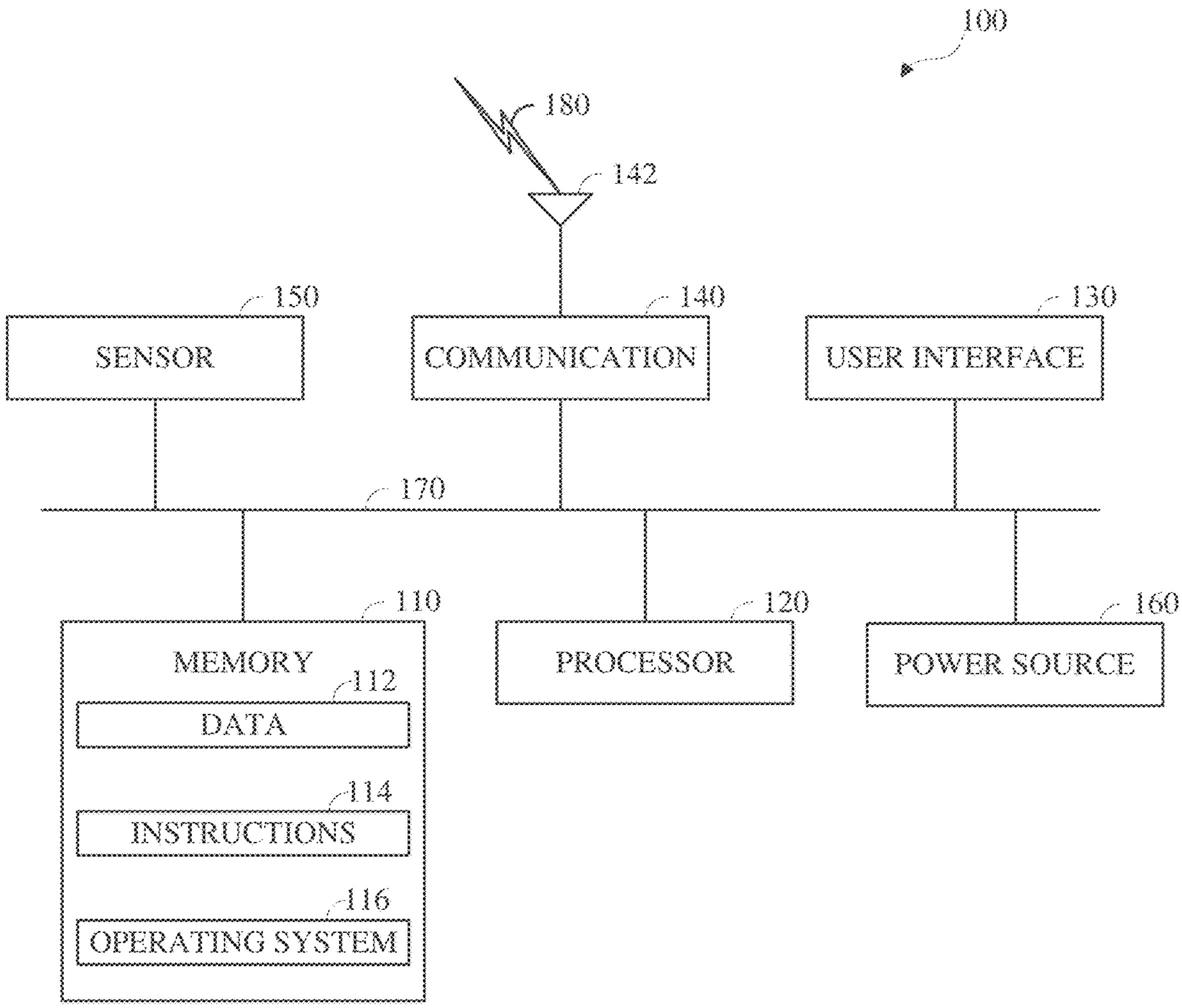
FIG. 1 is a diagram of a computing device in accordance with implementations of this disclosure.

Image and video compression schemes may include breaking an image, or frame, into smaller portions, such as blocks, and generating an output bitstream using techniques to minimize the bandwidth utilization of the information included for each block in the output. In some implementations, the information included for each block in the output may be limited by reducing spatial redundancy, reducing temporal redundancy, or a combination thereof. For example, temporal or spatial redundancies may be reduced by predicting a frame, or a portion thereof, based on information available to both the encoder and decoder, and including information representing a difference, or residual, between the predicted frame and the original frame in the encoded bitstream. The residual information may be further compressed by transforming the residual information into transform coefficients (e.g., energy compaction), quantizing the transform coefficients, and entropy coding the quantized transform coefficients. Other coding information, such as motion information, may be included in the encoded bitstream, which may include transmitting differential information based on predictions of the encoding information, which may be entropy coded to further reduce the corresponding bandwidth utilization. An encoded bitstream can be decoded to reconstruct the blocks and the source images from the limited information. In some implementations, the accuracy, efficiency, or both, of coding a block using either inter-prediction or intra-prediction may be limited.

Some block-based hybrid video coding techniques, or codecs, may be limited to reducing temporal redundancy using a translational motion model, which may inefficiently or inaccurately represent non-translational motion. Some block-based hybrid video coding techniques, or codecs, may include warped motion video coding, including warped motion compensation, which may improve the efficiency, accuracy, or both, relative to block-based hybrid video coding techniques that are limited to reducing temporal redundancy using a translational motion model, with respect to non-translational motion. For example, some block-based hybrid video coding techniques may include warped motion video coding using a global warped motion model, a local warped motion model, or both.

Some block-based hybrid video coding techniques, or codecs, which include warped motion video coding may signal warped motion model parameters inefficiently. For example, some block-based hybrid video coding techniques, or codecs, which include warped motion video coding may signal warped motion model parameters, such as global affine motion parameters, on a per-frame or a per-group-of-frames basis. Some block-based hybrid video coding techniques, or codecs, which include warped motion video coding may omit signaling warped motion model parameters, such as warped motion model parameters for a local warped motion model.

The encoding and decoding including dynamic range handling of high dimensional inverse autocorrelation in optical flow refinement described herein improves on video coding techniques, or codecs, by refining warped motion parameters in the absence of express signaling.

FIG. 1 is a diagram of a computing device 100 in accordance with implementations of this disclosure. The computing device 100 shown includes a memory 110, a processor 120, a user interface (UI) 130, an electronic communication unit 140, a sensor 150, a power source 160, and a bus 170. As used herein, the term "computing device" includes any unit, or a combination of units, capable of performing any method, or any portion or portions thereof, disclosed herein.

The computing device 100 may be a stationary computing device, such as a personal computer (PC), a server, a workstation, a minicomputer, or a mainframe computer; or a mobile computing device, such as a mobile telephone, a personal digital assistant (PDA), a laptop, or a tablet PC. Although shown as a single unit, any one element or elements of the computing device 100 can be integrated into any number of separate physical units. For example, the user interface 130 and processor 120 can be integrated in a first physical unit and the memory 110 can be integrated in a second physical unit.

The memory 110 can include any non-transitory computer-usable or computer-readable medium, such as any tangible device that can, for example, contain, store, communicate, or transport data 112, instructions 114, an operating system 116, or any information associated therewith, for use by or in connection with other components of the computing device 100. The non-transitory computer-usable or computer-readable medium can be, for example, a solid-state drive, a memory card, removable media, a read-only memory (ROM), a random-access memory (RAM), any type of disk including a hard disk, a floppy disk, an optical disk, a magnetic or optical card, an application-specific integrated circuits (ASICs), or any type of non-transitory media suitable for storing electronic information, or any combination thereof.

Although shown a single unit, the memory 110 may include multiple physical units, such as one or more primary memory units, such as random-access memory units, one or more secondary data storage units, such as disks, or a combination thereof. For example, the data 112, or a portion thereof, the instructions 114, or a portion thereof, or both, may be stored in a secondary storage unit and may be loaded or otherwise transferred to a primary storage unit in conjunction with processing the respective data 112, executing the respective instructions 114, or both. In some implementations, the memory 110, or a portion thereof, may be removable memory.

The data 112 can include information, such as input audio data, encoded audio data, decoded audio data, or the like. The instructions 114 can include directions, such as code, for performing any method, or any portion or portions thereof, disclosed herein. The instructions 114 can be realized in hardware, software, or any combination thereof. For example, the instructions 114 may be implemented as information stored in the memory 110, such as a computer program, which may be executed by the processor 120 to perform any of the respective methods, algorithms, aspects, or combinations thereof, as described herein.

Although shown as included in the memory 110, in some implementations, the instructions 114, or a portion thereof, may be implemented as a special purpose processor, or circuitry, that can include specialized hardware for carrying out any of the methods, algorithms, aspects, or combinations thereof, as described herein. Portions of the instructions 114 can be distributed across multiple processors on the same machine or different machines or across a network such as a local area network, a wide area network, the Internet, or a combination thereof.

The processor 120 can include any device or system capable of manipulating or processing a digital signal or other electronic information now-existing or hereafter developed, including optical processors, quantum processors, molecular processors, or a combination thereof. For example, the processor 120 can include a special purpose processor, a central processing unit (CPU), a digital signal processor (DSP), a plurality of microprocessors, one or more microprocessor in association with a DSP core, a controller, a microcontroller, an Application Specific Integrated Circuit (ASIC), a Field Programmable Gate Array (FPGA), a programmable logic array, programmable logic controller, microcode, firmware, any type of integrated circuit (IC), a state machine, or any combination thereof. As used herein, the term "processor" includes a single processor or multiple processors.

The user interface 130 can include any unit capable of interfacing with a user, such as a virtual or physical keypad, a touchpad, a display, a touch display, a speaker, a microphone, a video camera, a sensor, or any combination thereof. For example, the user interface 130 may be an audio-visual display device, and the computing device 100 may present audio, such as decoded audio, using the user interface 130 audio-visual display device, such as in conjunction with displaying video, such as decoded video. Although shown as a single unit, the user interface 130 may include one or more physical units. For example, the user interface 130 may include an audio interface for performing audio communication with a user, and a touch display for performing visual and touch-based communication with the user.

The electronic communication unit 140 can transmit, receive, or transmit and receive signals via a wired or wireless electronic communication medium 180, such as a radio frequency (RF) communication medium, an ultraviolet (UV) communication medium, a visible light communication medium, a fiber optic communication medium, a wireline communication medium, or a combination thereof. For example, as shown, the electronic communication unit 140 is operatively connected to an electronic communication interface 142, such as an antenna, configured to communicate via wireless signals.

Although the electronic communication interface 142 is shown as a wireless antenna in FIG. 1, the electronic communication interface 142 can be a wireless antenna, as shown, a wired communication port, such as an Ethernet port, an infrared port, a serial port, or any other wired or wireless unit capable of interfacing with a wired or wireless electronic communication medium 180. Although FIG. 1 shows a single electronic communication unit 140 and a single electronic communication interface 142, any number of electronic communication units and any number of electronic communication interfaces can be used.

The sensor 150 may include, for example, an audio-sensing device, a visible light-sensing device, a motion sensing device, or a combination thereof. For example, 100 the sensor 150 may include a sound-sensing device, such as a microphone, or any other sound-sensing device now existing or hereafter developed that can sense sounds in the proximity of the computing device 100, such as speech or other utterances, made by a user operating the computing device 100. In another example, the sensor 150 may include a camera, or any other image-sensing device now existing or hereafter developed that can sense an image such as the image of a user operating the computing device. Although a single sensor 150 is shown, the computing device 100 may include a number of sensors 150. For example, the computing device 100 may include a first camera oriented with a field of view directed toward a user of the computing device 100 and a second camera oriented with a field of view directed away from the user of the computing device 100.

The power source 160 can be any suitable device for powering the computing device 100. For example, the power source 160 can include a wired external power source interface; one or more dry cell batteries, such as nickel-cadmium (NiCd), nickel-zinc (NiZn), nickel metal hydride (NiMH), lithium-ion (Li-ion); solar cells; fuel cells; or any other device capable of powering the computing device 100. Although a single power source 160 is shown in FIG. 1, the computing device 100 may include multiple power sources 160, such as a battery and a wired external power source interface.

Although shown as separate units, the electronic communication unit 140, the electronic communication interface 142, the user interface 130, the power source 160, or portions thereof, may be configured as a combined unit. For example, the electronic communication unit 140, the electronic communication interface 142, the user interface 130, and the power source 160 may be implemented as a communications port capable of interfacing with an external display device, providing communications, power, or both.

One or more of the memory 110, the processor 120, the user interface 130, the electronic communication unit 140, the sensor 150, or the power source 160, may be operatively coupled via a bus 170. Although a single bus 170 is shown in FIG. 1, a computing device 100 may include multiple buses. For example, the memory 110, the processor 120, the user interface 130, the electronic communication unit 140, the sensor 150, and the bus 170 may receive power from the power source 160 via the bus 170. In another example, the memory 110, the processor 120, the user interface 130, the electronic communication unit 140, the sensor 150, the power source 160, or a combination thereof, may communicate data, such as by sending and receiving electronic signals, via the bus 170.

Although not shown separately in FIG. 1, one or more of the processor 120, the user interface 130, the electronic communication unit 140, the sensor 150, or the power source 160 may include internal memory, such as an internal buffer or register. For example, the processor 120 may include internal memory (not shown) and may read data 112 from the memory 110 into the internal memory (not shown) for processing.

Although shown as separate elements, the memory 110, the processor 120, the user interface 130, the electronic communication unit 140, the sensor 150, the power source 160, and the bus 170, or any combination thereof can be integrated in one or more electronic units, circuits, or chips.

Figure 2:
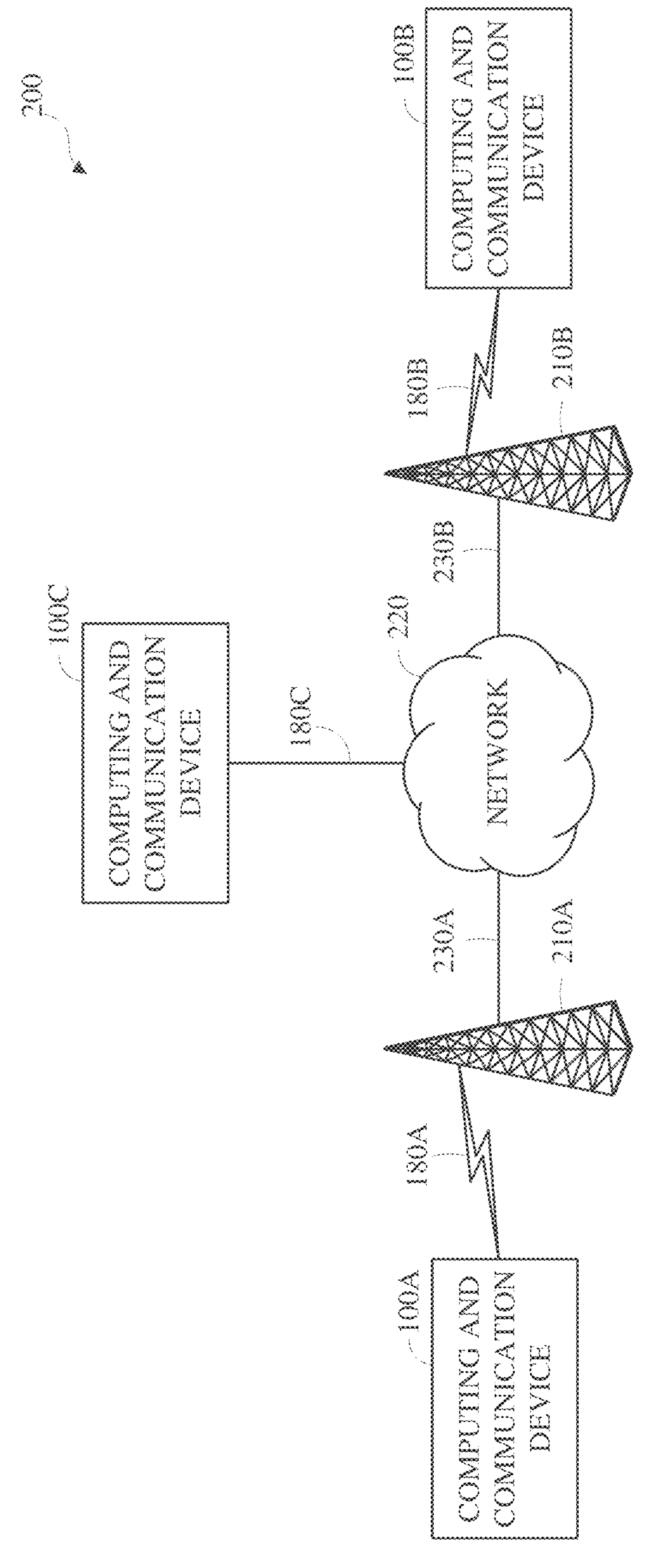
FIG. 2 is a diagram of a computing and communications system in accordance with implementations of this disclosure.

FIG. 2 is a diagram of a computing and communications system 200 in accordance with implementations of this disclosure. The computing and communications system 200 shown includes computing and communication devices 100A, 100B, 100C, access points 210A, 210B, and a network 220. For example, the computing and communication system 200 can be a multiple access system that provides communication, such as voice, audio, data, video, messaging, broadcast, or a combination thereof, to one or more wired or wireless communicating devices, such as the computing and communication devices 100A, 100B, 100C. Although, for simplicity, FIG. 2 shows three computing and communication devices 100A, 100B, 100C, two access points 210A, 210B, and one network 220, any number of computing and communication devices, access points, and networks can be used.

A computing and communication device 100A, 100B, 100C can be, for example, a computing device, such as the computing device 100 shown in FIG. 1. For example, the computing and communication devices 100A, 100B may be user devices, such as a mobile computing device, a laptop, a thin client, or a smartphone, and the computing and communication device 100C may be a server, such as a mainframe or a cluster. Although the computing and communication device 100A and the computing and communication device 100B are described as user devices, and the computing and communication device 100C is described as a server, any computing and communication device may perform some or all of the functions of a server, some, or all, of the functions of a user device, or some or all of the functions of a server and a user device. For example, the server computing and communication device 100C may receive, encode, process, store, transmit, or a combination thereof audio data and one or both of the computing and communication device 100A and the computing and communication device 100B may receive, decode, process, store, present, or a combination thereof the audio data.

Each computing and communication device 100A, 100B, 100C, which may include a user equipment (UE), a mobile station, a fixed or mobile subscriber unit, a cellular telephone, a personal computer, a tablet computer, a server, consumer electronics, or any similar device, can be configured to perform wired or wireless communication, such as via the network 220. For example, the computing and communication devices 100A, 100B, 100C can be configured to transmit or receive wired or wireless communication signals. Although each computing and communication device 100A, 100B, 100C is shown as a single unit, a computing and communication device can include any number of interconnected elements.

Each access point 210A, 210B can be any type of device configured to communicate with a computing and communication device 100A, 100B, 100C, a network 220, or both via wired or wireless communication links 180A, 180B, 180C. For example, an access point 210A, 210B can include a base station, a base transceiver station (BTS), a Node-B, an enhanced Node-B (eNode-B), a Home Node-B (HNode-B), a wireless router, a wired router, a hub, a relay, a switch, or any similar wired or wireless device. Although each access point 210A, 210B is shown as a single unit, an access point can include any number of interconnected elements.

The network 220 can be any type of network configured to provide services, such as voice, data, applications, voice over internet protocol (VOIP), or any other communications protocol or combination of communications protocols, over a wired or wireless communication link. For example, the network 220 can be a local area network (LAN), wide area network (WAN), virtual private network (VPN), a mobile or cellular telephone network, the Internet, or any other means of electronic communication. The network can use a communication protocol, such as the transmission control protocol (TCP), the user datagram protocol (UDP), the internet protocol (IP), the real-time transport protocol (RTP) the HyperText Transport Protocol (HTTP), or a combination thereof.

The computing and communication devices 100A, 100B, 100C can communicate with each other via the network 220 using one or more a wired or wireless communication links, or via a combination of wired and wireless communication links. For example, as shown the computing and communication devices 100A, 100B can communicate via wireless communication links 180A, 180B, and computing and communication device 100C can communicate via a wired communication link 180C. Any of the computing and communication devices 100A, 100B, 100C may communicate using any wired or wireless communication link, or links. For example, a first computing and communication device 100A can communicate via a first access point 210A using a first type of communication link, a second computing and communication device 100B can communicate via a second access point 210B using a second type of communication link, and a third computing and communication device 100C can communicate via a third access point (not shown) using a third type of communication link. Similarly, the access points 210A, 210B can communicate with the network 220 via one or more types of wired or wireless communication links 230A, 230B. Although FIG. 2 shows the computing and communication devices 100A, 100B, 100C in communication via the network 220, the computing and communication devices 100A, 100B, 100C can communicate with each other via any number of communication links, such as a direct wired or wireless communication link.

In some implementations, communications between one or more of the computing and communication device 100A, 100B, 100C may omit communicating via the network 220 and may include transferring data via another medium (not shown), such as a data storage device. For example, the server computing and communication device 100C may store audio data, such as encoded audio data, in a data storage device, such as a portable data storage unit, and one or both of the computing and communication device 100A or the computing and communication device 100B may access, read, or retrieve the stored audio data from the data storage unit, such as by physically disconnecting the data storage device from the server computing and communication device 100C and physically connecting the data storage device to the computing and communication device 100A or the computing and communication device 100B.

Other implementations of the computing and communications system 200 are possible. For example, in an implementation, the network 220 can be an ad-hoc network and can omit one or more of the access points 210A, 210B. The computing and communications system 200 may include devices, units, or elements not shown in FIG. 2. For example, the computing and communications system 200 may include many more communicating devices, networks, and access points.

Figure 3:
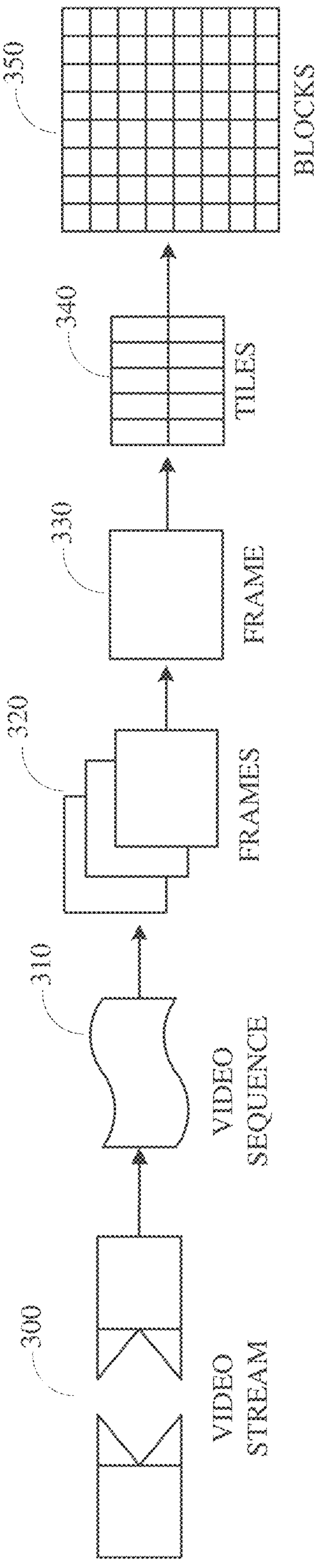
FIG. 3 is a diagram of a video stream for use in encoding and decoding in accordance with implementations of this disclosure.

FIG. 3 is a diagram of a video stream 300 for use in encoding and decoding in accordance with implementations of this disclosure. A video stream 300, such as a video stream captured by a video camera or a video stream generated by a computing device, may include a video sequence 310. The video sequence 310 may include a sequence of adjacent frames 320. Although three adjacent frames 320 are shown, the video sequence 310 can include any number of adjacent frames 320.

Each frame 330 from the adjacent frames 320 may represent a single image from the video stream. Although not shown in FIG. 3, a frame 330 may include one or more segments, tiles, or planes, which may be coded, or otherwise processed, independently, such as in parallel. A frame 330 may include one or more tiles 340. Each of the tiles 340 may be a rectangular region of the frame that can be coded independently. Each of the tiles 340 may include respective blocks 350. Although not shown in FIG. 3, a block can include pixels. For example, a block can include a 16×16 group of pixels, an 8×8 group of pixels, an 8×16 group of pixels, or any other group of pixels. Unless otherwise indicated herein, the term 'block' can include a superblock, a macroblock, a segment, a slice, or any other portion of a frame. A frame, a block, a pixel, or a combination thereof can include display information, such as luminance information, chrominance information, or any other information that can be used to store, modify, communicate, or display the video stream or a portion thereof.

Figure 4:
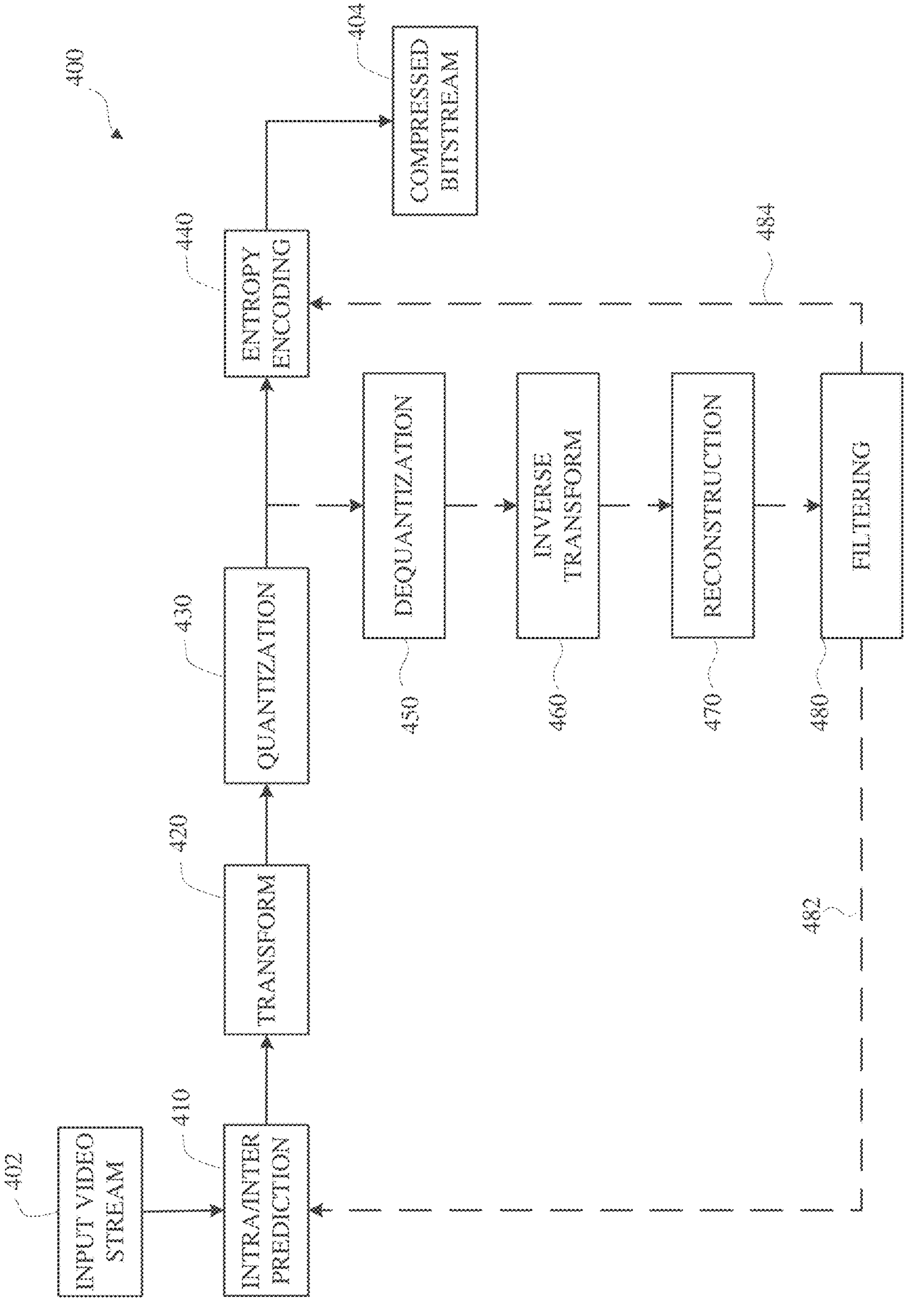
FIG. 4 is a block diagram of an encoder in accordance with implementations of this disclosure.

FIG. 4 is a block diagram of an encoder 400 in accordance with implementations of this disclosure. Encoder 400 can be implemented in a device, such as the computing device 100 shown in FIG. 1 or the computing and communication devices 100A, 100B, 100C shown in FIG. 2, as, for example, a computer software program stored in a data storage unit, such as the memory 110 shown in FIG. 1. The computer software program can include machine instructions that may be executed by a processor, such as the processor 120 shown in FIG. 1, and may cause the device to encode video data as described herein. The encoder 400 can be implemented as specialized hardware included, for example, in computing device 100.

The encoder 400 can encode an input video stream 402, such as the video stream 300 shown in FIG. 3, to generate an encoded (compressed) bitstream 404. In some implementations, the encoder 400 may include a forward path for generating the compressed bitstream 404. The forward path may include an intra/inter prediction unit 410, a transform unit 420, a quantization unit 430, an entropy encoding unit 440, or any combination thereof. In some implementations, the encoder 400 may include a reconstruction path (indicated by the broken connection lines) to reconstruct a frame for encoding of further blocks. The reconstruction path may include a dequantization unit 450, an inverse transform unit 460, a reconstruction unit 470, a filtering unit 480, or any combination thereof. Other structural variations of the encoder 400 can be used to encode the video stream 402.

For encoding the video stream 402, each frame within the video stream 402 can be processed in units of blocks. Thus, a current block may be identified from the blocks in a frame, and the current block may be encoded.

At the intra/inter prediction unit 410, the current block can be encoded using either intra-frame prediction, which may be within a single frame, or inter-frame prediction, which may be from frame to frame. Intra-prediction may include generating a prediction block from samples in the current frame that have been previously encoded and reconstructed. Inter-prediction may include generating a prediction block from samples in one or more previously constructed reference frames. Generating a prediction block for a current block in a current frame may include performing motion estimation to generate a motion vector indicating an appropriate reference portion of the reference frame.

The intra/inter prediction unit 410 may subtract the prediction block from the current block (raw block) to produce a residual block. The transform unit 420 may perform a block-based transform, which may include transforming the residual block into transform coefficients in, for example, the frequency domain. Examples of block-based transforms include the Karhunen-Loève Transform (KLT), the Discrete Cosine Transform (DCT), the Singular Value Decomposition Transform (SVD), and the Asymmetric Discrete Sine Transform (ADST). In an example, the DCT may include transforming a block into the frequency domain. The DCT may include using transform coefficient values based on spatial frequency, with the lowest frequency (i.e., DC) coefficient at the top-left of the matrix and the highest frequency coefficient at the bottom-right of the matrix.

The quantization unit 430 may convert the transform coefficients into discrete quantum values, which may be referred to as quantized transform coefficients or quantization levels. The quantized transform coefficients can be entropy encoded by the entropy encoding unit 440 to produce entropy-encoded coefficients. Entropy encoding can include using a probability distribution metric. The entropy-encoded coefficients and information used to decode the block, which may include the type of prediction used, motion vectors, and quantizer values, can be output to the compressed bitstream 404. The compressed bitstream 404 can be formatted using various techniques, such as run-length encoding (RLE) and zero-run coding.

Figure 5:
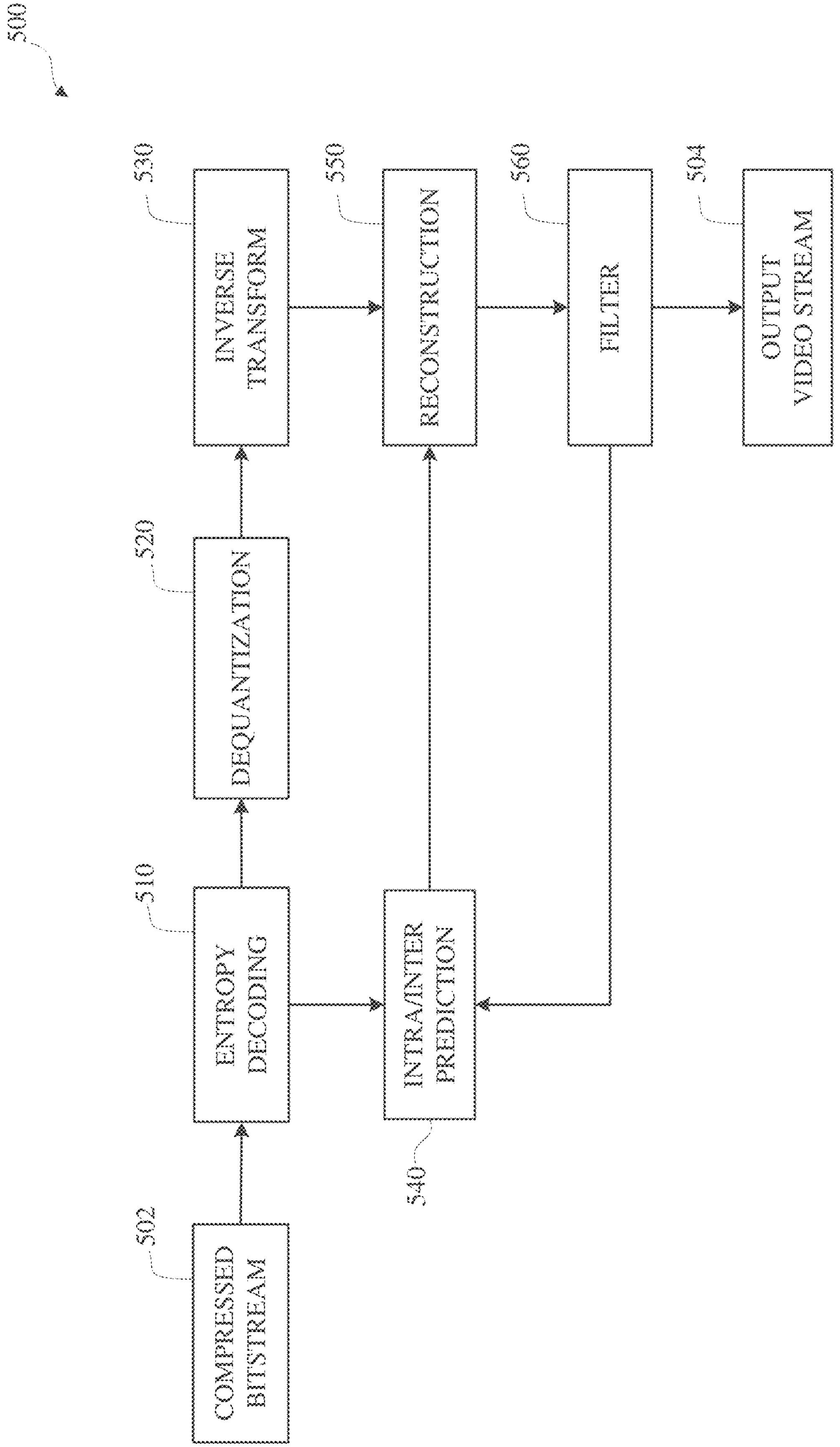
FIG. 5 is a block diagram of a decoder in accordance with implementations of this disclosure.

The reconstruction path can be used to maintain reference frame synchronization between the encoder 400 and a corresponding decoder, such as the decoder 500 shown in FIG. 5. The reconstruction path may be similar to the decoding process discussed below and may include decoding the encoded frame, or a portion thereof, which may include decoding an encoded block, which may include dequantizing the quantized transform coefficients at the dequantization unit 450 and inverse transforming the dequantized transform coefficients at the inverse transform unit 460 to produce a derivative residual block. The reconstruction unit 470 may add the prediction block generated by the intra/inter prediction unit 410 to the derivative residual block to create a decoded block. The filtering unit 480 can be applied to the decoded block to generate a reconstructed block, which may reduce distortion, such as blocking artifacts. Although one filtering unit 480 is shown in FIG. 4, filtering the decoded block may include loop filtering, deblocking filtering, or other types of filtering or combinations of types of filtering. The reconstructed block may be stored or otherwise made accessible as a reconstructed block, which may be a portion of a reference frame, for encoding another portion of the current frame, another frame, or both, as indicated by the broken line at 482. Coding information, such as deblocking threshold index values, for the frame may be encoded, included in the compressed bitstream 404, or both, as indicated by the broken line at 484.

Other variations of the encoder 400 can be used to encode the compressed bitstream 404. For example, a non-transform-based encoder 400 can quantize the residual block directly without the transform unit 420. In some implementations, the quantization unit 430 and the dequantization unit 450 may be combined into a single unit.

FIG. 5 is a block diagram of a decoder 500 in accordance with implementations of this disclosure. The decoder 500 can be implemented in a device, such as the computing device 100 shown in FIG. 1 or the computing and communication devices 100A, 100B, 100C shown in FIG. 2, as, for example, a computer software program stored in a data storage unit, such as the memory 110 shown in FIG. 1. The computer software program can include machine instructions that may be executed by a processor, such as the processor 120 shown in FIG. 1, and may cause the device to decode video data as described herein. The decoder 500 can be implemented as specialized hardware included, for example, in computing device 100.

The decoder 500 may receive a compressed bitstream 502, such as the compressed bitstream 404 shown in FIG. 4, and may decode the compressed bitstream 502 to generate an output video stream 504. The decoder 500 may include an entropy decoding unit 510, a dequantization unit 520, an inverse transform unit 530, an intra/inter prediction unit 540, a reconstruction unit 550, a filtering unit 560, or any combination thereof. Other structural variations of the decoder 500 can be used to decode the compressed bitstream 502.

The entropy decoding unit 510 may decode data elements within the compressed bitstream 502 using, for example, Context Adaptive Binary Arithmetic Decoding, to produce a set of quantized transform coefficients. The dequantization unit 520 can dequantize the quantized transform coefficients, and the inverse transform unit 530 can inverse transform the dequantized transform coefficients to produce a derivative residual block, which may correspond to the derivative residual block generated by the inverse transform unit 460 shown in FIG. 4. Using header information decoded from the compressed bitstream 502, the intra/inter prediction unit 540 may generate a prediction block corresponding to the prediction block created in the encoder 400. At the reconstruction unit 550, the prediction block can be added to the derivative residual block to create a decoded block. The filtering unit 560 can be applied to the decoded block to reduce artifacts, such as blocking artifacts, which may include loop filtering, deblocking filtering, or other types of filtering or combinations of types of filtering, and which may include generating a reconstructed block, which may be output as the output video stream 504.

Other variations of the decoder 500 can be used to decode the compressed bitstream 502. For example, the decoder 500 can produce the output video stream 504 without deblocking filtering.

Figure 6:
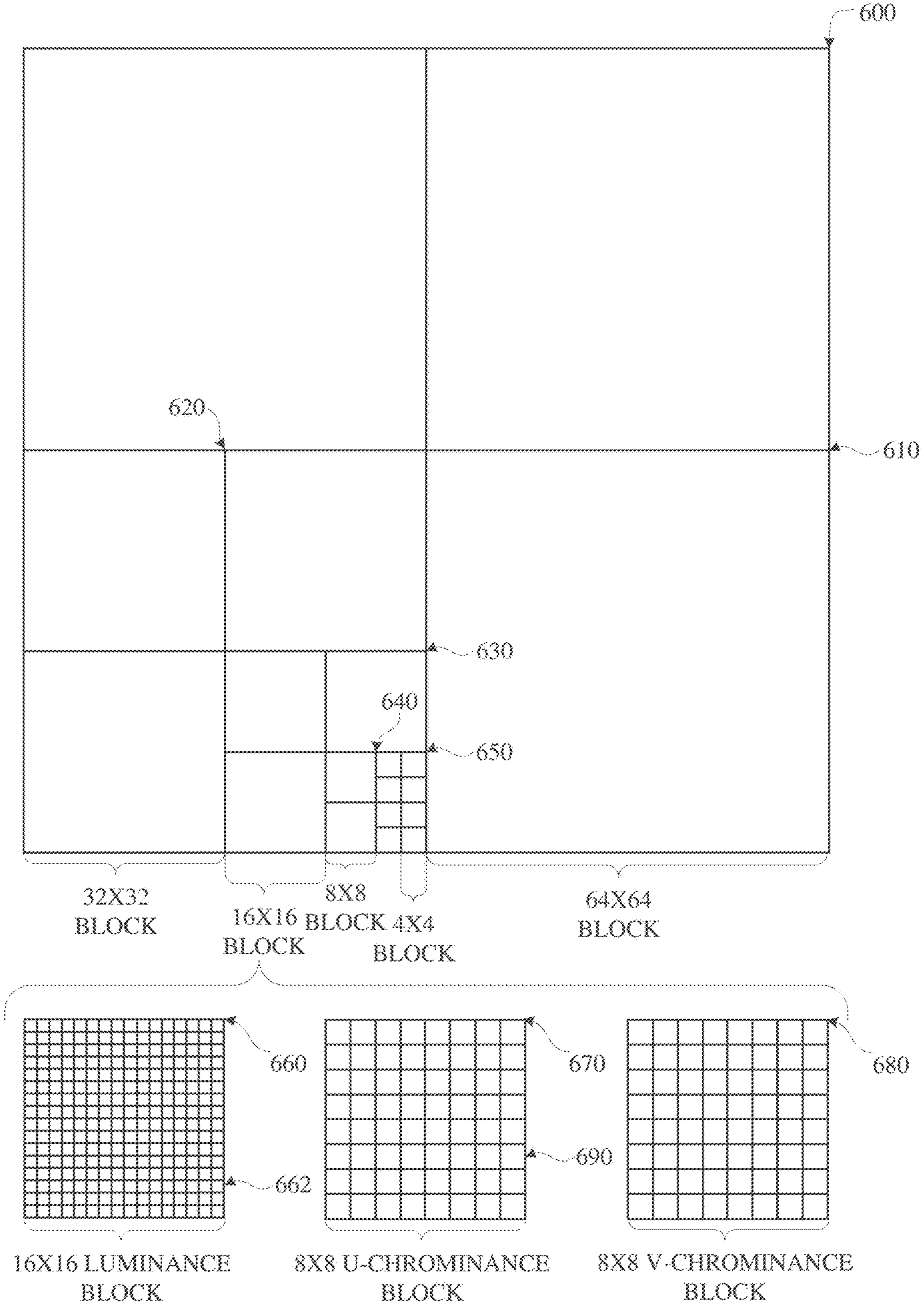
FIG. 6 is a block diagram of a representation of a portion of a frame in accordance with implementations of this disclosure.

FIG. 6 is a block diagram of a representation of a portion 600 of a frame, such as the frame 330 shown in FIG. 3, in accordance with implementations of this disclosure. As shown, the portion 600 of the frame includes four 64×64 blocks 610, in two rows and two columns in a matrix or Cartesian plane. In some implementations, a 64×64 block may be a maximum coding unit, N=64. Each 64×64 block may include four 32×32 blocks 620. Each 32×32 block may include four 16×16 blocks 630. Each 16×16 block may include four 8×8 blocks 640. Each 8×8 block 640 may include four 4×4 blocks 650. Each 4×4 block 650 may include 16 pixels, which may be represented in four rows and four columns in each respective block in the Cartesian plane or matrix. The pixels may include information representing an image captured in the frame, such as luminance information, color information, and location information. In some implementations, a block, such as a 16×16 pixel block as shown, may include a luminance block 660, which may include luminance pixels 662; and two chrominance blocks 670, 680, such as a U or Cb chrominance block 670, and a V or Cr chrominance block 680. The chrominance blocks 670, 680 may include chrominance pixels 690. For example, the luminance block 660 may include 16×16 luminance pixels 662 and each chrominance block 670, 680 may include 8×8 chrominance pixels 690 as shown. Although one arrangement of blocks is shown, any arrangement may be used. Although FIG. 6 shows N×N blocks, in some implementations, N×M blocks may be used. For example, 32×64 blocks, 64×32 blocks, 16×32 blocks, 32×16 blocks, or any other size blocks may be used. In some implementations, N×2N blocks, 2N×N blocks, or a combination thereof may be used.

In some implementations, video coding may include ordered block-level coding. Ordered block-level coding may include coding blocks of a frame in an order, such as raster-scan order, wherein blocks may be identified and processed starting with a block in the upper left corner of the frame, or portion of the frame, and proceeding along rows from left to right and from the top row to the bottom row, identifying each block in turn for processing. For example, the 64×64 block in the top row and left column of a frame may be the first block coded and the 64×64 block immediately to the right of the first block may be the second block coded. The second row from the top may be the second row coded, such that the 64×64 block in the left column of the second row may be coded after the 64×64 block in the rightmost column of the first row.

In some implementations, coding a block may include using quad-tree coding, which may include coding smaller block units within a block in raster-scan order. For example, the 64×64 block shown in the bottom left corner of the portion of the frame shown in FIG. 6, may be coded using quad-tree coding wherein the top left 32×32 block may be coded, then the top right 32×32 block may be coded, then the bottom left 32×32 block may be coded, and then the bottom right 32×32 block may be coded. Each 32×32 block may be coded using quad-tree coding wherein the top left 16×16 block may be coded, then the top right 16×16 block may be coded, then the bottom left 16×16 block may be coded, and then the bottom right 16×16 block may be coded. Each 16×16 block may be coded using quad-tree coding wherein the top left 8×8 block may be coded, then the top right 8×8 block may be coded, then the bottom left 8×8 block may be coded, and then the bottom right 8×8 block may be coded. Each 8×8 block may be coded using quad-tree coding wherein the top left 4×4 block may be coded, then the top right 4×4 block may be coded, then the bottom left 4×4 block may be coded, and then the bottom right 4×4 block may be coded. In some implementations, 8×8 blocks may be omitted for a 16×16 block, and the 16×16 block may be coded using quad-tree coding wherein the top left 4×4 block may be coded, then the other 4×4 blocks in the 16×16 block may be coded in raster-scan order.

In some implementations, video coding may include compressing the information included in an original, or input, frame by, for example, omitting some of the information in the original frame from a corresponding encoded frame. For example, coding may include reducing spectral redundancy, reducing spatial redundancy, reducing temporal redundancy, or a combination thereof.

In some implementations, reducing spectral redundancy may include using a color model based on a luminance component (Y) and two chrominance components (U and V or Cb and Cr), which may be referred to as the YUV or YCbCr color model, or color space. Using the YUV color model may include using a relatively large amount of information to represent the luminance component of a portion of a frame and using a relatively small amount of information to represent each corresponding chrominance component for the portion of the frame. For example, a portion of a frame may be represented by a high-resolution luminance component, which may include a 16×16 block of pixels, and by two lower resolution chrominance components, each of which represents the portion of the frame as an 8×8 block of pixels. A pixel may indicate a value, for example, a value in the range from 0 to 255, and may be stored or transmitted using, for example, eight bits. Although this disclosure is described in reference to the YUV color model, any color model may be used.

In some implementations, reducing spatial redundancy may include transforming a block into the frequency domain using, for example, a discrete cosine transform (DCT). For example, a unit of an encoder, such as the transform unit 420 shown in FIG. 4, may perform a DCT using transform coefficient values based on spatial frequency.

In some implementations, reducing temporal redundancy may include using similarities between frames to encode a frame using a relatively small amount of data based on one or more reference frames, which may be previously encoded, decoded, and reconstructed frames of the video stream. For example, a block or pixel of a current frame may be similar to a spatially corresponding block or pixel of a reference frame. In some implementations, a block or pixel of a current frame may be similar to block or pixel of a reference frame at a different spatial location and reducing temporal redundancy may include generating motion information indicating the spatial difference, or translation, between the location of the block or pixel in the current frame and corresponding location of the block or pixel in the reference frame.

In some implementations, reducing temporal redundancy may include identifying a portion of a reference frame that corresponds to a current block or pixel of a current frame. For example, a reference frame, or a portion of a reference frame, which may be stored in memory, may be searched to identify a portion for generating a prediction to use for encoding a current block or pixel of the current frame with maximal efficiency. For example, the search may identify a portion of the reference frame for which the difference in pixel values between the current block and a prediction block generated based on the portion of the reference frame is minimized and may be referred to as motion searching. In some implementations, the portion of the reference frame searched may be limited. For example, the portion of the reference frame searched, which may be referred to as the search area, may include a limited number of rows of the reference frame. In an example, identifying the portion of the reference frame for generating a prediction may include calculating a cost function, such as a sum of absolute differences (SAD), between the pixels of portions of the search area and the pixels of the current block.

In some implementations, the spatial difference between the location of the portion of the reference frame for generating a prediction in the reference frame and the current block in the current frame may be represented as a motion vector. The difference in pixel values between the prediction block and the current block may be referred to as differential data, residual data, a prediction error, or as a residual block. In some implementations, generating motion vectors may be referred to as motion estimation, and a pixel of a current block may be indicated based on location using Cartesian coordinates as $f_{x,y}$. Similarly, a pixel of the search area of the reference frame may be indicated based on location using Cartesian coordinates as $r_{x,y}$. A motion vector (MV) for the current block may be determined based on, for example, a SAD between the pixels of the current frame and the corresponding pixels of the reference frame.

Although described herein with reference to matrix or Cartesian representation of a frame for clarity, a frame may be stored, transmitted, processed, or any combination thereof, in any data structure such that pixel values may be efficiently represented for a frame or image. For example, a frame may be stored, transmitted, processed, or any combination thereof, in a two-dimensional data structure such as a matrix as shown, or in a one-dimensional data structure, such as a vector array. In an implementation, a representation of the frame, such as a two-dimensional representation as shown, may correspond to a physical location in a rendering of the frame as an image. For example, a location in the top left corner of a block in the top left corner of the frame may correspond with a physical location in the top left corner of a rendering of the frame as an image.

In some implementations, block-based coding efficiency may be improved by partitioning input blocks into one or more prediction partitions, which may be rectangular, including square, partitions for prediction coding. In some implementations, video coding using prediction partitioning may include selecting a prediction partitioning scheme from among multiple candidate prediction partitioning schemes. For example, in some implementations, candidate prediction partitioning schemes for a 64×64 coding unit may include rectangular size prediction partitions ranging in sizes from 4×4 to 64×64, such as 4×4, 4×8, 8×4, 8×8, 8×16, 16×8, 16×16, 16×32, 32×16, 32×32, 32×64, 64×32, or 64×64. In some implementations, video coding using prediction partitioning may include a full prediction partition search, which may include selecting a prediction partitioning scheme by encoding the coding unit using each available candidate prediction partitioning scheme and selecting the best scheme, such as the scheme that produces the least rate-distortion error.

In some implementations, encoding a video frame may include identifying a prediction partitioning scheme for encoding a current block, such as block 610. In some implementations, identifying a prediction partitioning scheme may include determining whether to encode the block as a single prediction partition of maximum coding unit size, which may be 64×64 as shown, or to partition the block into multiple prediction partitions, which may correspond with the sub-blocks, such as the 32×32 blocks 620 the 16×16 blocks 630, or the 8×8 blocks 640, as shown, and may include determining whether to partition into one or more smaller prediction partitions. For example, a 64×64 block may be partitioned into four 32×32 prediction partitions. Three of the four 32×32 prediction partitions may be encoded as 32×32 prediction partitions and the fourth 32×32 prediction partition may be further partitioned into four 16×16 prediction partitions. Three of the four 16×16 prediction partitions may be encoded as 16×16 prediction partitions and the fourth 16×16 prediction partition may be further partitioned into four 8×8 prediction partitions, each of which may be encoded as an 8×8 prediction partition. In some implementations, identifying the prediction partitioning scheme may include using a prediction partitioning decision tree.

In some implementations, video coding for a current block may include identifying an optimal prediction coding mode from multiple candidate prediction coding modes, which may provide flexibility in handling video signals with various statistical properties and may improve the compression efficiency. For example, a video coder may evaluate each candidate prediction coding mode to identify the optimal prediction coding mode, which may be, for example, the prediction coding mode that minimizes an error metric, such as a rate-distortion cost, for the current block. In some implementations, the complexity of searching the candidate prediction coding modes may be reduced by limiting the set of available candidate prediction coding modes based on similarities between the current block and a corresponding prediction block. In some implementations, the complexity of searching each candidate prediction coding mode may be reduced by performing a directed refinement mode search. For example, metrics may be generated for a limited set of candidate block sizes, such as 16×16, 8×8, and 4×4, the error metric associated with each block size may be in descending order, and additional candidate block sizes, such as 4×8 and 8×4 block sizes, may be evaluated.

In some implementations, block-based coding efficiency may be improved by partitioning a current residual block into one or more transform partitions, which may be rectangular, including square, partitions for transform coding. In some implementations, video coding, such as video coding using transform partitioning, may include selecting a uniform transform partitioning scheme. For example, a current residual block, such as block 610, may be a 64×64 block and may be transformed without partitioning using a 64×64 transform.

Although not expressly shown in FIG. 6, a residual block may be transform partitioned using a uniform transform partitioning scheme. For example, a 64×64 residual block may be transform partitioned using a uniform transform partitioning scheme including four 32×32 transform blocks, using a uniform transform partitioning scheme including sixteen 16×16 transform blocks, using a uniform transform partitioning scheme including sixty-four 8×8 transform blocks, or using a uniform transform partitioning scheme including 256 4×4 transform blocks.

In some implementations, video coding, such as video coding using transform partitioning, may include identifying multiple transform block sizes for a residual block using multiform transform partition coding. In some implementations, multiform transform partition coding may include recursively determining whether to transform a current block using a current block size transform or by partitioning the current block and multiform transform partition coding each partition. For example, the bottom left block 610 shown in FIG. 6 may be a 64×64 residual block, and multiform transform partition coding may include determining whether to code the current 64×64 residual block using a 64×64 transform or to code the 64×64 residual block by partitioning the 64×64 residual block into partitions, such as four 32×32 blocks 620, and multiform transform partition coding each partition. In some implementations, determining whether to transform partition the current block may be based on comparing a cost for encoding the current block using a current block size transform to a sum of costs for encoding each partition using partition size transforms.

Figure 7:
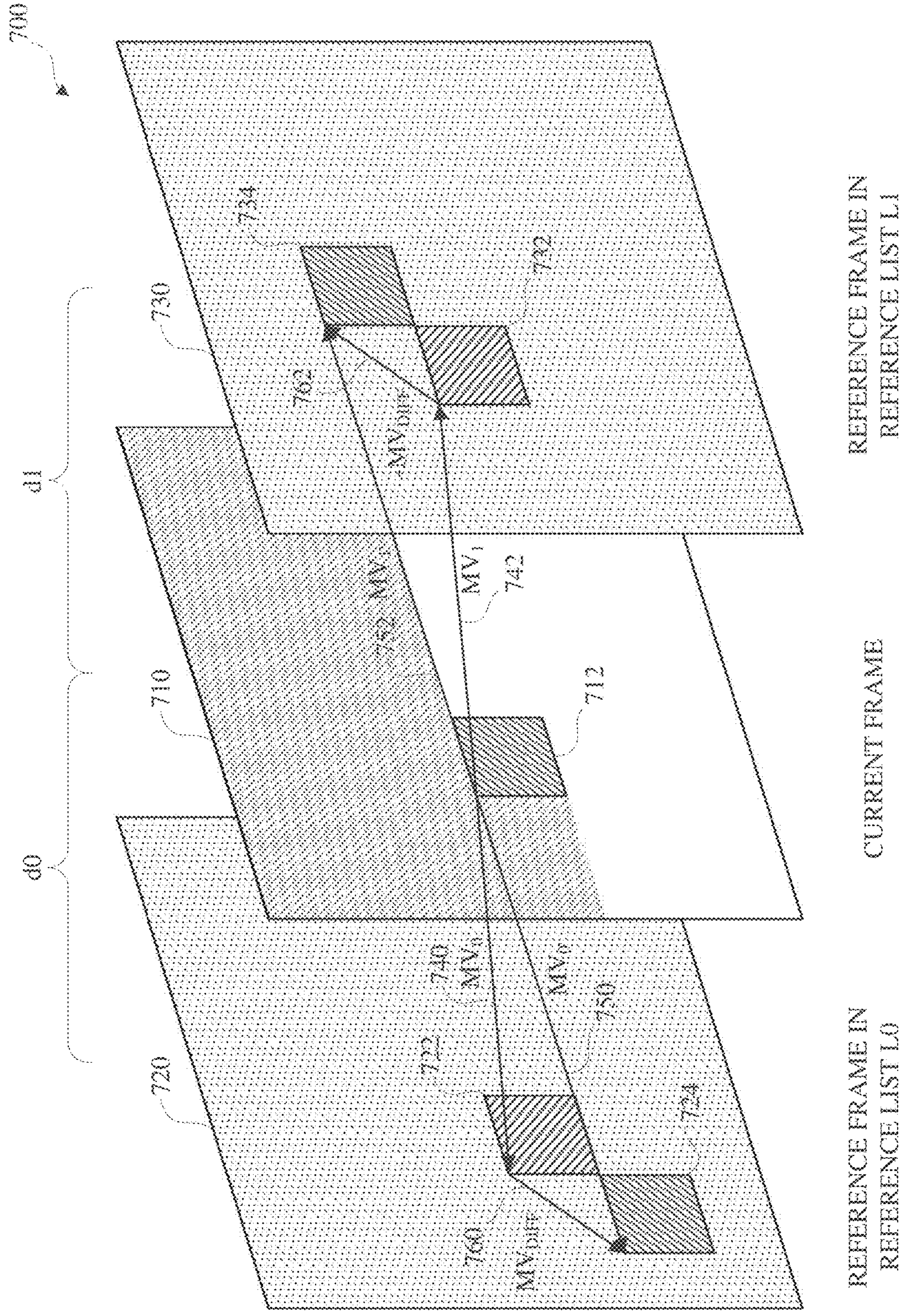
FIG. 7 is a block diagram of an example of bilateral-matching based decoder-side motion vector refinement for translational motion.

FIG. 7 is a block diagram of an example of bilateral-matching (BM) based decoder-side motion vector refinement for translational motion 700. Bilateral-matching based decoder-side motion vector refinement for translational motion 700 may be implemented by a decoder, such as the decoder 500 shown in FIG. 5. Bilateral-matching based decoder-side motion vector refinement for translational motion 700 may be implemented by an encoder, such as the encoder 400 shown in FIG. 4, wherein "decoder-side" indicates that bilateral-matching (BM) based decoder-side motion vector refinement for translational motion 700 includes using information currently available at for decoding the encoded video sequence, or a portion thereof, such as previously reconstructed reference frame data, omits, or excludes, using information unavailable at for decoding the encoded video sequence, or a portion thereof, and omits, or excludes including information unavailable at for decoding the encoded video sequence, or a portion thereof, in the compressed bitstream, except as is described herein or as is otherwise clear from context.

Bilateral-matching based decoder-side motion vector refinement for translational motion 700, as implemented by the encoder, includes encoding an input video steam, such as the input video stream 402 shown in FIG. 4, or one or more portions thereof, to generate an encoded (compressed) output bitstream, such as the encoded (compressed) bitstream 404 shown in FIG. 4.

Bilateral-matching based decoder-side motion vector refinement for translational motion 700, as implemented by the decoder, includes decoding an encoded video steam, such as the compressed bitstream 502 shown in FIG. 5, or one or more portions thereof, to generate an encoded (compressed) output bitstream, such as the encoded (compressed) bitstream 404 shown in FIG. 4.

In block-based hybrid video coding, to reduce, or minimize, the resource utilization, such as bandwidth utilization, for signaling, storing, or both, compressed, or encoded, video data, redundant data, such as spatially redundant data, temporally redundant data, or both, is omitted or excluded from the compressed, or encoded, data.

Bilateral-matching based decoder-side motion vector refinement for translational motion 700 includes encoding, or decoding, using bi-directional merge candidates, such as in bi-directional prediction (bi-prediction). The previously reconstructed reference frame data may include backward reference frames, which may be previously reconstructed frames sequentially subsequent to the current frame, such as in temporal or frame index order. The previously reconstructed reference frame data may include forward reference frames, which may be previously reconstructed frames prior to the current frame, such as in temporal or frame index order. The reference frames may be indicated in one or more reference picture lists, such as a first reference picture list (L0), a second reference picture list (L1), or both. In some implementations, the first reference picture list (L0) may be a forward prediction reference picture list (forward reference picture list) and the second reference picture list (L1) may be a backward prediction reference picture list (backward reference picture list).

Bi-prediction includes obtaining a refined motion vector by searching areas of the previously reconstructed reference frame data, such as from the forward reference picture list (L0), the second reference picture list (L1), or both, identified in accordance with one or more previously obtained motion vectors. Bilateral matching includes obtaining, determining, or calculating, distortion between candidate blocks obtained from the previously reconstructed reference frame data, such as distortion between a first candidate block obtained from previously reconstructed reference frame data from the forward reference picture list (L0) and a second candidate block obtained from previously reconstructed reference frame data from the second reference picture list (L1).

FIG. 7 shows a current frame 710, a first reference frame 720 from the forward reference picture list (L0), and a second reference frame 730 from the backward reference picture list (L1).

The current frame 710 includes a current block 712. A first portion of the current frame 710 is shown with a dark stippled background to indicate that reconstructed frame data corresponding to the first portion of the current frame 710 is available as (spatial) reference data for decoding, or encoding, the current block 712. A second portion of the current frame 710 is shown with a white background to indicate that reconstructed frame data corresponding to the second portion of the current frame 710 is unavailable as reference data for decoding, or encoding, the current block 712. The current block 712 is shown with diagonal-up lined background (from left to right) to indicate that bilateral-matching based decoder-side motion vector refinement for translational motion 700 includes decoding, or encoding, the current block 712.

The first reference frame 720 is shown as including a first block 722 at a location in the first reference frame 720 indicated by a first previously obtained motion vector 740 ($MV_0$) relative to the location of the current block 712 in the current frame 710. The first reference frame 720 is shown with a lightly stippled background to indicate that reconstructed frame data corresponding to the first reference frame 720 is available as (temporal) reference data for decoding, or encoding, the current block 712. The first block 722 is shown with diagonal-down lined background (from left to right) to indicate that the first block 722 corresponds to the first previously obtained motion vector 740 ($MV_0$).

The second reference frame 730 is shown as including a second block 732 at a location in the second reference frame 730 indicated by a second previously obtained motion vector 742 ($MV_1$) relative to the location of the current block 712 in the current frame 710. The second reference frame 730 is shown with a lightly stippled background to indicate that reconstructed frame data corresponding to the second reference frame 730 is available as a (temporal) reference data for decoding, or encoding, the current block 712. The second block 732 is shown with diagonal-down lined background (from left to right) to indicate that the second block 732 corresponds to the second previously obtained motion vector 742 ($MV_1$).

The temporal distance (d0) from the first reference frame 720 to the current frame 710 matches the temporal distance (d1) from the current frame 710 to the second reference frame 730.

FIG. 7 shows a first directional line representing a first refined motion vector 750 ($MV_{0'}$) and a second directional line representing a second refined motion vector 752 ($MV_{1'}$) aligned with the first refined motion vector 750 ($MV_{0'}$) indicating that the motion, or trajectory, from the first reference frame 720, through the current frame 710, to the second reference frame 730 is continuous, such as constructively continuous. The first refined motion vector 750 ($MV_{0'}$) mirrors the second refined motion vector 752 ($MV_{1'}$) relative to the current frame 710.

Bilateral-matching based decoder-side motion vector refinement for translational motion 700 includes searching the first reference frame 720 in an area around the first block 722, as indicated by the first motion vector 740 ($MV_0$), to obtain a location of a first refined matching block 724, in accordance with which the first refined motion vector 750 ($MV_{0'}$) is obtained. The first refined matching block 724 is shown with diagonal-up lined background (from left to right) to indicate that the first refined matching block 724 corresponds to the first refined motion vector 750 ($MV_{0'}$), and to indicate that the first refined matching block 724 is used as a reference to encode the current block 712. Obtaining the first refined matching block 724 may include generating the first refined matching block 724 from the reconstructed data in the first reference frame 720, such as using interpolation.

FIG. 7 shows a third directional line indicating a first offset motion vector 760 ($MV_{DIFF}$), indicating an offset from the location in the first reference frame 720 indicated by the first motion vector 740 ($MV_0$) and the location in the first reference frame 720 indicated by the first refined motion vector 750 ($MV_{0'}$).

Bilateral-matching based decoder-side motion vector refinement for translational motion 700 includes searching the second reference frame 730 in an area around the second block 732, as indicated by the second motion vector 742 ($MV_1$), to obtain a location of a second refined matching block 734, in accordance with which the second refined motion vector 752 ($MV_{1'}$) is obtained. The second refined matching block 734 is shown with diagonal-up lined background (from left to right) to indicate that the second refined matching block 734 corresponds to the second refined motion vector 752 ($MV_{1'}$), and to indicate that the second refined matching block 734 is used as a reference to encode the current block 712. Obtaining the second refined matching block 734 may include generating the second refined matching block 734 from the reconstructed data in the second reference frame 730, such as using interpolation.

FIG. 7 shows a fourth directional line indicating a second offset motion vector 762 ($-MV_{DIFF}$), indicating an offset from the location in the second reference frame 730 indicated by the second motion vector 742 ($MV_1$) and the location in the second reference frame 730 indicated by the second refined motion vector 752 ($MV_{1'}$).

Searching the first reference frame 720 and searching the second reference frame 730 includes evaluating candidate motion vectors, or candidate motion vector pairs, wherein the first refined motion vector 750 ($MV_{0'}$) and the second refined motion vector 752 ($MV_{1'}$) are a candidate motion vector pair. Obtaining the first refined matching block 724 and obtaining the second refined matching block 734 includes determining that an error metric, such as a sum of absolute differences, between the first refined matching block 724 and the second refined matching block 734, is minimal among respective candidate blocks, obtained from the first reference frame 720 and the second reference frame 730, corresponding to respective candidate motion vector pairs.

In some implementations, bilateral-matching based decoder-side motion vector refinement for translational motion 700 may be used for translational motion vectors, having two parameters representing translational motion, and may be unavailable for warped motion vectors, having more than two parameters or otherwise representing motion other than translational motion.

In some implementations, bilateral-matching based decoder-side motion vector refinement for translational motion 700 may be used for coding blocks, or coding units, in accordance with the following characteristics. In some implementations, bilateral-matching based decoder-side motion vector refinement for translational motion 700 includes bilateral-matching based decoder-side motion vector refinement for translational motion 700 for blocks, or coding units, using coding unit level merge mode with bi-prediction motion vector. In some implementations, bilateral-matching based decoder-side motion vector refinement for translational motion 700 includes bilateral-matching based decoder-side motion vector refinement for translational motion 700 for blocks, or coding units, coded using a backward prediction reference picture, or frame, and a forward prediction reference picture, or frame. In some implementations, bilateral-matching based decoder-side motion vector refinement for translational motion 700 includes bilateral-matching based decoder-side motion vector refinement for translational motion 700 for blocks, or coding units, wherein the distances, which may correspond with a picture order count (POC) difference, for the reference frames to the current frame are match. In some implementations, bilateral-matching based decoder-side motion vector refinement for translational motion 700 includes bilateral-matching based decoder-side motion vector refinement for translational motion 700 for blocks, or coding units, wherein the reference frames are short-term reference frames. In some implementations, bilateral-matching based decoder-side motion vector refinement for translational motion 700 includes bilateral-matching based decoder-side motion vector refinement for translational motion 700 for blocks, or coding units, wherein the current block, or coding unit, includes greater than sixty-four luma, or luminance, samples. In some implementations, bilateral-matching based decoder-side motion vector refinement for translational motion 700 includes bilateral-matching based decoder-side motion vector refinement for translational motion 700 for blocks, or coding units, wherein the height of the block, or coding unit, is greater than or equal to eight luma, or luminance, samples, the width of the block, or coding unit, is greater than or equal to eight luma, or luminance, samples, or both. In some implementations, bilateral-matching based decoder-side motion vector refinement for translational motion 700 includes bilateral-matching based decoder-side motion vector refinement for translational motion 700 for blocks, or coding units, wherein a bi-prediction with coding unit based weighting (BCW) weight index indicates equal weights. In some implementations, bilateral-matching based decoder-side motion vector refinement for translational motion 700 includes bilateral-matching based decoder-side motion vector refinement for translational motion 700 for blocks, or coding units, wherein weighted prediction is disabled for the current block. In some implementations, bilateral-matching based decoder-side motion vector refinement for translational motion 700 includes bilateral-matching based decoder-side motion vector refinement for translational motion 700 for blocks, or coding units, wherein the use of combined inter-picture merge and intra-picture prediction (CIIP) mode is omitted for the current block. Bilateral-matching based decoder-side motion vector refinement for translational motion 700 may be unavailable for blocks, or coding units, other than blocks, or coding units, having the preceding characteristics.

The refined motion vector, or motion vectors, obtained using bilateral-matching based decoder-side motion vector refinement for translational motion 700 is, or are, used to generate the inter prediction samples. The refined motion vector, or motion vectors, obtained using bilateral-matching based decoder-side motion vector refinement for translational motion 700 is, or are, used in temporal motion vector prediction for subsequent coding. The first motion vector, the second motion vector, or both, may be used for deblocking. The first motion vector, the second motion vector, or both, may be used in spatial motion vector prediction for subsequent block, or coding unit, coding.

Figure 8:
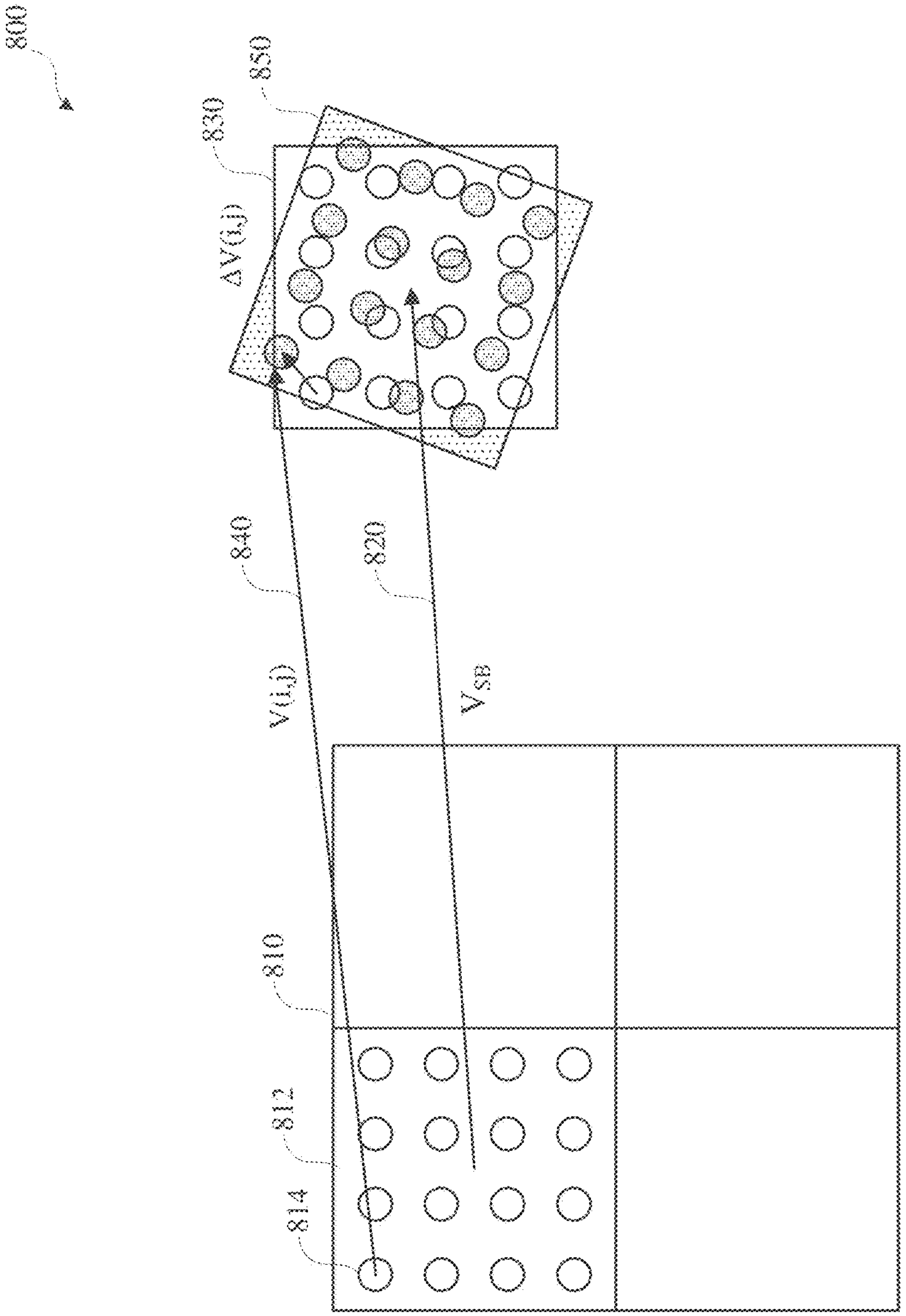
FIG. 8 is a block diagram of an example of prediction refinement with optical flow.

FIG. 8 is a block diagram of an example of prediction refinement with optical flow 800. Prediction refinement with optical flow 800 may be implemented by a decoder, such as the decoder 500 shown in FIG. 5. Prediction refinement with optical flow 800 may be implemented by an encoder, such as the encoder 400 shown in FIG. 4. As used herein, the term "warped" motion refers to non-translational motion, such as affine motion, homographic motion, or similarity motion, in addition to, or instead of, translational motion.

Motion, other than translational motion, which may be inaccurately represented using translational motion vectors, may be expressed in accordance with a warped motion model, such as a homographic warped motion model, an affine warped motion model, a similarity warped motion model, or another warped motion model. In some implementations, six-parameter warped motion may be referred to as six-parameter affine motion, and a corresponding model may be referred to as a six-parameter affine motion model. In some implementations, a model corresponding to six-parameter warped motion may be referred to as a six-parameter warped motion model. In some implementations, four-parameter warped motion may be referred to as four-parameter affine motion, and a corresponding model may be referred to as a four-parameter affine motion model. In some implementations, a model corresponding to four-parameter warped motion may be referred to as a four-parameter warped motion model.

FIG. 8 shows a current block 810 including a current subblock 812, including pixels (shown as circles), including a current pixel 814. FIG. 8 shows a translational motion vector 820 ($V_{SB}$) from the current subblock 812 to a translational predicted block 830. FIG. 8 shows a warped motion vector 840 (V(i,j)) from the current pixel 814 in the current subblock 812 to a corresponding pixel location in the warped predicted block 850. Prediction refinement with optical flow 800 includes obtaining per-pixel refined motion vectors by refining the translational motion vector 820 ($V_{SB}$).

Subblock-based warped, or affine, motion compensation can reduce memory access bandwidth, computation complexity, or both, relative to pixel-based motion compensation. Subblock-based warped, or affine, motion compensation may reduce prediction accuracy relative to pixel-based motion compensation. To obtain a finer granularity, such as a smaller block size, of motion compensation, prediction refinement with optical flow 800 is used to refine the subblock based warped, or affine, motion compensated prediction and avoid an increase of the memory access bandwidth for motion compensation. In some implementations, subsequent to subblock based warped, or affine, motion compensation, luma, or luminance, prediction samples are refined.

Prediction refinement with optical flow 800 may include obtaining a subblock prediction I(i, j) using subblock-based warped, or affine, motion compensation.

Prediction refinement with optical flow 800 may include obtaining spatial gradients $g_x(i, j)$ and $g_y(i, j)$ of the subblock prediction at respective sample locations using a filter, such as a three-tap filter [−1, 0, 1]. In some implementations, the gradient calculation in bi-directional optical flow (BDOF) may be used, where the spatial gradients using a gradient precision control parameter (shift1) may be expressed as the following:

$$g_x(i, j) = (I(i+1, j) \gg \text{shift1}) - (I(i-1, j) \gg \text{shift1}),$$

$$g_y(i, j) = (I(i, j+1) \gg \text{shift1}) - (I(i, j-1) \gg \text{shift1}).$$

Prediction refinement with optical flow 800 may include subblock prediction, such as for a 4×4 subblock, which may be extended by a sample on the respective sides for obtaining the gradient. To avoid increasing memory bandwidth utilization, interpolation computation, or both, the nearest integer pixel position in the reference picture, or frame, may be used as the extended samples.

Prediction refinement with optical flow 800 may include obtaining the luma prediction refinement based on optical flow, which may include using a difference (ΔV(i, j)) between a sample motion vector 840 (V(i, j)) obtained using a warped, or affine, model for a sample location (i, j), and the translational motion vector 820 ($V_{SB}$) of the subblock that includes the sample (i, j), and which may be expressed as the following:

$$\Delta I(i,j) = g_x(i,j) * \Delta v_x(i,j) + g_y(i,j) * \Delta v_y(i,j). \qquad \text{[Equation 1]}$$

The difference (ΔV(i, j)) is quantized in the unit of 1/32 luma sample precision and may be referred to as a luma prediction refinement.

Warped, or affine, model parameters and sample locations relative to the subblock center may be unchanged from subblock to subblock, such that the difference (ΔV(i, j)) obtained for a first subblock, such as the top-left subblock 812, may be used for other subblocks in the block 810 or coding unit. The motion vector difference with respect to the center of the subblock (ΔV(x, y)) may be obtained using a horizontal offset (dx(i, j)) and vertical offset (dy(i, j)) from the sample location (i, j) to the center of the subblock ($x_{SB}$, $y_{SB}$), which may be expressed as the following:

$$dx(i,j) = i - x_{SB},$$

$$dy(i,j) = j - y_{SB},$$

$$\Delta V_x(i,j) = C \cdot dx(i,j) + D \cdot dy(i,j),$$

$$\Delta V_y(i,j) = E \cdot dx(i,j) + F \cdot dy(i,j).$$

For accuracy, the center of the subblock ($x_{SB}$, $y_{SB}$) may be obtained with respect to the subblock width ($W_{SB}$) and the subblock height ($H_{SB}$), wherein a result of dividing, by two, a result of subtracting one from the subblock width ($W_{SB}$) may be obtained as a horizontal component of the center, and a result of dividing, by two, a result of subtracting one from the subblock height ($H_{SB}$) may be obtained as a vertical component of the center, which may be expressed as the following (($W_{SB}$−1)/2, (($H_{SB}$−1)/2).

A homographic warped motion model includes eight parameters to indicate displacement between pixels of the current block and pixels of the reference frame, such as in a quadrilateral portion of the reference frame, for generating a prediction block. A homographic warped motion model may represent translation, rotation, scaling, changes in aspect ratio, shearing, and other non-parallelogram warping.

An affine warped motion model includes six parameters to indicate displacement between pixels of the current block and pixels of the reference frame, such as in a parallelogram portion of the reference frame, for generating a prediction block. An affine warped motion model is a linear transformation between the coordinates of two spaces represented by the six-parameters. An affine warped motion model may represent translation, rotation, scale, changes in aspect ratio, and shearing. The parameters of the affine warped motion model include a first pair of parameters ($h_{13}$, $h_{23}$) that represent translational motion (translational parameters), such a horizontal translational motion parameter ($h_{13}$) and a vertical translational motion parameter ($h_{23}$). The parameters of the affine warped motion model include a second pair of parameters ($h_{11}$, $h_{22}$) that represent scaling (scaling parameters), such a horizontal scaling parameter ($h_{11}$) and a vertical scaling parameter ($h_{22}$). The parameters of the affine warped motion model include a third pair of parameters ($h_{12}$, $h_{21}$) that, in conjunction with the scaling parameters, represent angular rotation (rotational parameters). For example, for a current pixel at position (x, y) from the current frame, a corresponding position (x', y') from the reference frame may be indicated using the affine warped motion model, which may include a horizontal displacement (x') for encoding the current block that is a result of adding a result of multiplying the horizontal scaling parameter by the current horizontal position, a result of multiplying the first rotational parameter by the current vertical position, and the horizontal translational motion parameter, and a vertical displacement (y') for encoding the current block that is a result of adding a result of multiplying the vertical scaling parameter by the current horizontal position, a result of multiplying the second rotational parameter by the current vertical position, and the vertical translational motion parameter, which may be expressed as the following:

$$x' = h_{11}x + h_{12}y + h_{13}, \qquad \text{[Equation 2]}$$

$$y' = h_{21}x + h_{21}y + h_{23}. \qquad \text{[Equation 3]}$$

The six-parameter affine warped motion model, including a top-left control point motion vector ($v_{0x}$, $v_{0y}$), a top-right control point motion vector ($v_{1x}$, $v_{1y}$), a bottom-left control point motion vector ($v_{2x}$, $v_{2y}$), a width (w) of the block, or coding unit, and a height (h) of the block, or coding unit, may be expressed as the following:

$$C = \frac{v_{1x} - v_{0x}}{w}$$

$$D = \frac{v_{2x} - v_{0x}}{h}$$

$$E = \frac{v_{1y} - v_{0y}}{w}$$

$$F = \frac{v_{2y} - v_{0y}}{h}.$$

A similarity warped motion model includes four-parameters to indicate displacement between pixels of the current block and pixels of the reference frame, such as in a square portion of the reference frame, for generating a prediction block. A similarity warped motion model is a linear transformation between the coordinates of two spaces represented by the four-parameters. For example, the four-parameters can be a translation along the x-axis, a translation along the y-axis, a rotation value, and a zoom value. A similarity warped motion model may represent square-to-square transformation with rotation and zoom. The parameters of the similarity warped motion model include a first pair of parameters ($h_{13}$, $h_{23}$) that represent translational motion (translational parameters), such a horizontal translational motion parameter ($h_{13}$) and a vertical translational motion parameter ($h_{23}$). The parameters of the similarity warped motion model include a second parameter ($h_{11}$) that represent scaling (scaling parameter) ($h_{22}$=$h_{11}$). The parameters of the similarity warped motion model include a third parameter ($h_{21}$) that, in conjunction with the scaling parameter, represents angular rotation (rotational parameter) ($h_{12}$=$h_{21}$). For example, for a current pixel at position (x, y) from the current frame, a corresponding position (x', y') from the reference frame may be indicated using the similarity warped motion model, which may include a horizontal displacement (x') for encoding the current block that is a result of adding a result of subtracting a result of multiplying the rotational parameter by the current vertical position, from a result of multiplying the horizontal scaling parameter by the current horizontal position, and the horizontal translational motion parameter, and a vertical displacement (y') for encoding the current block that is a result of adding a result of multiplying the rotational parameter by the current horizontal position, a result of multiplying the horizontal scaling parameter by the current vertical position, and the vertical translational motion parameter, which may be expressed as the following:

$$x' = h_{11}x + h_{12}y + h_{13}, \quad \text{[Equation 4]}$$

$$y' = h_{21}x + h_{21}y + h_{23}. \quad \text{[Equation 5]}$$

The four-parameter similarity warped motion model, including a top-left control point motion vector ($v_{0x}$, $v_{0y}$), a top-right control point motion vector ($v_{1x}$, $v_{1y}$), and a width (w) of the block, or coding unit, may be expressed as the following:

$$C = F = \frac{v_{1x} - v_{0x}}{w}$$

$$E = -D = \frac{v_{1y} - v_{0y}}{w}.$$

The parameters of a warped motion model, other than the translational parameters, are non-translational parameters.

The luma prediction refinement (ΔI(i, j)) is added to the subblock prediction (I(i, j)) to obtain the resulting prediction (I'), which may be expressed as the following:

$$I'(i, j) = I(i, j) + \Delta I(i, j),$$

In some implementations, prediction refinement with optical flow 800 may be omitted for block, or subblock, coded using a warped motion model wherein the control point motion vectors (CPMVs), which may be referred to as refined motion vectors, match, which indicates the block, or coding unit, has translational motion and omits other motion.

In some implementations, prediction refinement with optical flow 800 may be omitted for block, or subblock, coded using a warped motion model wherein the warped motion parameters are greater than a defined limit in accordance with using block, or coding unit, based motion compensation, and omitting using subblock based warped motion compensation, to avoid relatively large memory access bandwidth utilization.

Although not shown separately, in some implementations, coding may include multi-pass decoder-side motion vector refinement. A first pass of multi-pass decoder-side motion vector refinement may include bilateral matching with respect to the coding block. A second pass of multi-pass decoder-side motion vector refinement may include bilateral matching with respect to respective subblocks, such as 16×16 subblocks, within the coding block. A third pass of multi-pass decoder-side motion vector refinement may include refining respective motion vectors in respective subblocks, such as 8×8 subblocks, by applying bi-directional optical flow. The refined motion vectors may be stored for spatial motion vector prediction, temporal motion vector prediction, or both.

The first pass of multi-pass decoder-side motion vector refinement includes block based bilateral matching motion vector refinement. A refined motion vector is obtained, or derived, by applying bilateral matching to a coding block. Refined motion vectors are obtained by searching portions of reference frames obtained from the reference picture lists L0 and L1 in accordance with previously obtained motion vectors (MV0 and MV1). The refined motion vectors ($MV\mathbf{0}_{pass1}$ and $MV\mathbf{1}_{pass1}$) are obtained, or derived, in accordance with the previously obtained motion vectors (MV0 and MV1) based on the minimum bilateral matching cost between the two reference, or prediction, blocks in L0 and L1.

Bilateral matching includes a local search to obtain an integer sample precision difference motion vector (intDeltaMV). The local search applies a 3×3 square search pattern to loop through a defined search range, ([−sHor, sHor]) in the horizontal direction and [−sVer, sVer] in the vertical direction, wherein, the values of sHor and sVer are determined in accordance with the block dimension, and the maximum value of sHor and sVer is eight.

Obtaining, such as calculating, the bilateral matching cost (bilCost) may be expressed as bilCost=mvDistanceCost+sadCost. The block size (cbW*cbH) may be greater than sixty-four and a mean-removal sum of absolute differences (MRSADWha) cost function may be used to remove the DC effect of distortion between reference, or prediction, blocks. The bilateral matching cost (bilCost) at the center point of the 3×3 search pattern may have the minimum cost, and the integer sample precision difference motion vector (intDeltaMV) local search may be otherwise omitted. The bilateral matching cost (bilCost) at the center point of the 3×3 search pattern may have other than the minimum cost, the current minimum cost search point may be used the center point of the 3×3 search pattern, the search for the minimum cost may continue to the end of the search range.

Fractional sample refinement may be applied to obtain, or derive, a difference motion vector (deltaMV). Obtaining the refined motion vectors after the first pass may be expressed as the following:

$$MV0pass1 = MV0 + \text{delta}MV,$$

$$MV1pass1 = MV1 - \text{delta}MV.$$

The second pass of multi-pass decoder-side motion vector refinement includes subblock based bilateral matching motion vector refinement. In the second pass, a refined motion vector is obtained by applying bilateral matching to a 16×16 grid subblock. For respective subblocks, a respective refined motion vector is searched around the motion vectors ($MV\mathbf{0}_{pass1}$ and $MV\mathbf{1}_{pass1}$), obtained from the first pass, in the reference picture list L0 and L1. The refined motion vectors ($MV\mathbf{0}_{pass2}$(sbIdx2) and $MV\mathbf{1}_{pass2}$(sbIdx2)) are obtained based on the minimum bilateral matching cost between the two reference, or prediction, subblocks in L0 and L1.

For respective subblocks, bilateral matching includes searching to obtain the integer sample precision difference motion vector (intDeltaMV). The search has a search range [−sHor, sHor] in the horizontal direction and [−sVer, sVer] in vertical the direction, wherein, the values of sHor and sVer are determined by the block dimension, and the maximum value of sHor and sVer may be eight.

The bilateral matching cost is obtained, such as calculated, by applying a cost factor (costFactor) to the sum of absolute Hadamard transformed difference (SATD) cost between two reference, or prediction, subblocks, which may be expressed as bilCost=satdCost*costFactor. The search area (2*sHor+1)*(2*sVer+1) may be divided into five diamond shape search regions. The respective search regions are assigned a cost factor (costFactor), which is determined by the distance (intDeltaMV) between respective search points and the coarse motion vector, and respective diamond shape search regions are processed in the order starting from the center of the search area. In respective regions, the search points are processed in the raster scan order starting from the top left going to the bottom right corner of the region. The minimum bilateral matching cost (bilCost) within the current search region may be less than a threshold equal to a result of multiplying the subblock width by the subblock height (sbW*sbH) and the integer pixel search may be otherwise omitted; otherwise, the integer pixel search continues to the next search region until the search points are examined. In some implementations, the difference between the previous minimum cost and the current minimum cost in the iteration may be less than a threshold that is equal to the area of the block, and the search process may be otherwise omitted.

In some implementations, decoder-side motion vector refinement fractional sample refinement may be used to obtain, or derive, the difference motion vector deltaMV (sbIdx2). Obtaining the refined motion vectors of second pass may be expressed as the following:

$$MV0_{pass2}(sbIdx2) = MV0_{pass1} + \text{delta}MV(sbIdx2),$$

$$MV1_{pass2}(sbIdx2) = MV1_{pass1} - \text{delta}MV(sbIdx2).$$

The third pass of multi-pass decoder-side motion vector refinement includes subblock based bi-directional optical flow motion vector refinement. In the third pass, a refined motion vector is obtained by applying bi-directional optical flow to an 8×8 grid subblock. For respective 8×8 subblocks, bi-directional optical flow refinement is applied to obtain scaled Vx and Vy without clipping starting from the refined motion vector of the parent subblock of the second pass. The obtained bioMv(Vx, Vy) is rounded to 1/16 sample precision and clipped between −32 and 32.

Obtaining the refined motion vectors ($MV\mathbf{0}_{pass3}$(sbIdx3) and $MV\mathbf{1}_{pass3}$(sbIdx3)) from the third pass may be expressed as the following:

$$MV0_{pass3}(sbIdx3) = MV0_{pass2}(sbIdx2) + bioMv,$$

$$MV1_{pass3}(sbIdx3) = MV0_{pass2}(sbIdx2) - bioMv.$$

Although not shown separately, in some implementations, coding may include warped, or affine, decoder-side motion vector refinement. Warped, or affine, decoder-side motion vector refinement is applied on warped, or affine, merge coded blocks to improve coding efficiency. The warped, or affine, model, including a top-left control point motion vector ($v_{0x}$, $v_{0y}$), a top-right ($v_{1x}$, $v_{1y}$) control point motion vector, a bottom-left control point motion vector ($v_{2x}$, $v_{2y}$), a width (w) of the block, or coding unit, and a height (h) of the block, or coding unit, can be expressed as the following:

$$mv_x = \frac{v_{1x} - v_{0x}}{w} \cdot x + \frac{v_{2x} - v_{0x}}{H} \cdot y + v_{0x},$$

$$mv_y = \frac{v_{1y} - v_{0y}}{w} \cdot x + \frac{v_{2y} - v_{0y}}{H} \cdot y + v_{0y}.$$

The base motion vector ($v_{0x}$, $v_{0y}$) represents the translational motion of the affine model. With the affine decoder-side motion vector refinement, the base motion vector of the affine model of a coding block in affine merge mode is refined by applying the first step of multi-pass decoder-side motion vector refinement. Other steps of multi-pass decoder-side motion vector refinement are omitted. A translational motion vector offset is added to ($v_{0x}$, $v_{0y}$), ($v_{1x}$, $v_{1y}$), and ($v_{2x}$, $v_{2y}$) of a candidate in the affine merge list that meets the decoder-side motion vector refinement condition. The motion vector offset is obtained, or derived, by minimizing the cost of bilateral matching which as in decoder-side motion vector refinement.

Multi-pass decoder-side motion vector refinement is efficient and is computationally complex. Decoder-side motion vector refinement is limited to using the translational model. In affine decoder-side motion vector refinement, the translational part is refined, and other parts are unrefined. In some implementations, affine motion estimation first solves an affine equation and then converts the solution to control point motion vectors, which introduces error during the conversion. Decoder-side motion vector refinement may introduce quantization error. Decoder-side motion vector refinement may introduce rounding error.

Although prediction refinement with optical flow is described herein, optical flow motion vector refinement may be used. Optical flow motion vector refinement includes bilateral matching that uses compound references to derive local motion vector offsets on a per-subblock basis, such as per 8×8 subblock or per 4×4 subblock. Optical flow motion vector refinement includes obtaining two translational parameters per subblock based on an optical flow equation, such as Equation 1. Optical flow motion vector refinement includes obtaining two compound prediction reference, or prediction, blocks (P0 and P1) based on forward and backward motion vectors (MV0 and MV1). Optical flow motion vector refinement includes obtaining x and y spatial gradients (Gx0, Gx1, Gy0, Gy1), for the compound prediction reference, or prediction, blocks (P0 and P1). Optical flow motion vector refinement includes parameter solving, where d0 and d1 are signed temporal distances (positive for past and negative for future). Optical flow motion vector refinement includes obtaining four motion vector offsets based on a two-dimensional inverse autocorrelation problem. Optical flow motion vector refinement includes obtaining motion compensation on a per-subblock basis using refined motion vectors obtained based on the motion vector offsets.

Figure 9:
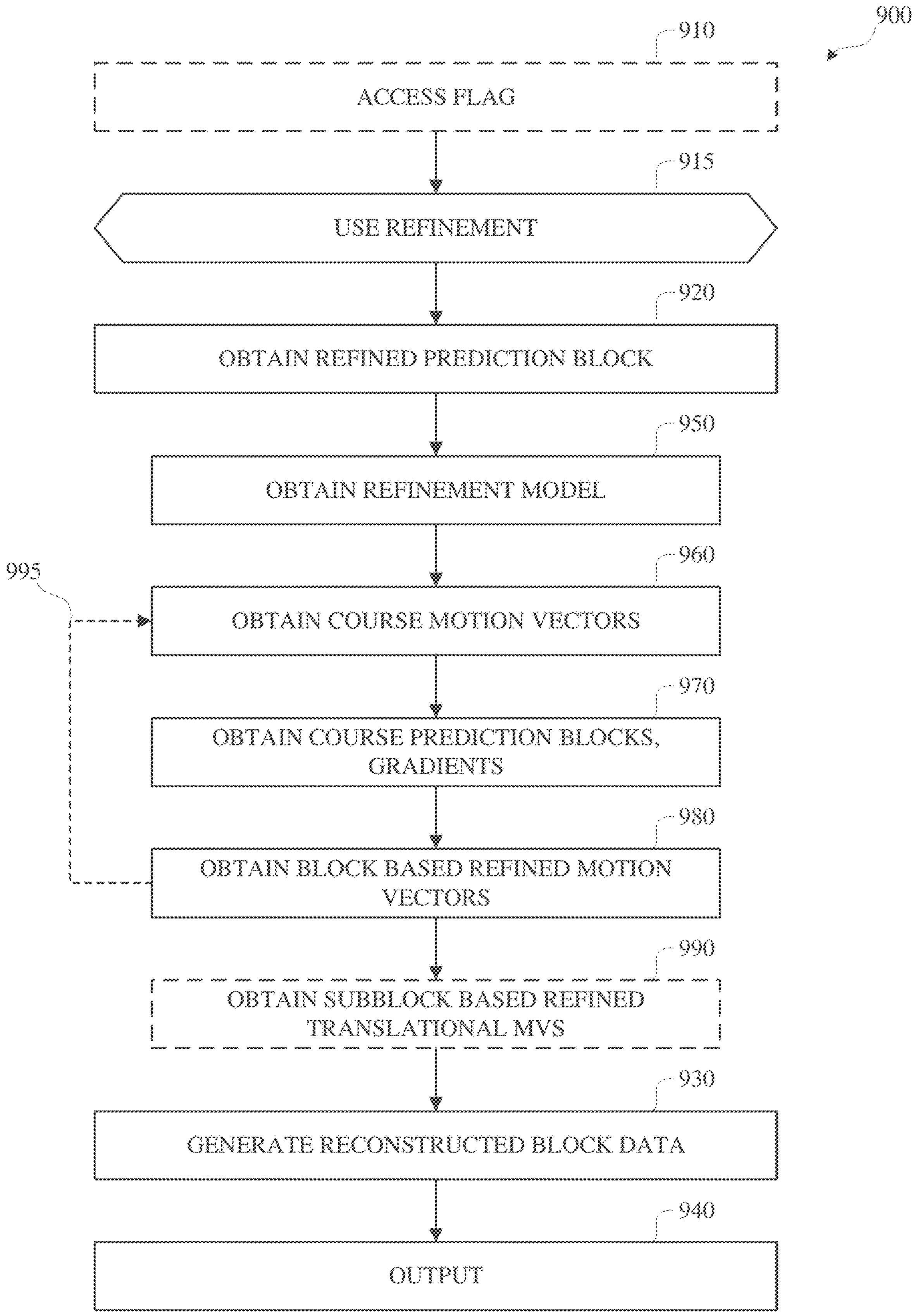
FIG. 9 is a flow diagram of an example of decoding including motion refinement using bilateral, or compound, matching with one or more warped refinement models.

FIG. 9 is a flow diagram of an example of decoding including motion refinement using bilateral, or compound, matching with one or more warped refinement models 900. Decoding including motion refinement using bilateral, or compound, matching with one or more warped refinement models 900 may be implemented by a decoder, such as the decoder 500 shown in FIG. 5. Although not expressly shown in FIG. 9, encoding including motion refinement using bilateral, or compound, matching with one or more warped refinement models is similar to decoding including motion refinement using bilateral, or compound, matching with one or more warped refinement models 900, except as is described herein or as is otherwise clear from context. Encoding including motion refinement using bilateral, or compound, matching with one or more warped refinement models may be implemented by an encoder, such as the encoder 400 shown in FIG. 4.

Decoding including motion refinement using bilateral, or compound, matching with one or more warped refinement models 900 includes generating reconstructed block data by decoding a current block of a current frame from an encoded bitstream, such as the encoded (compressed) bitstream 404 shown in FIG. 4.

Decoding including motion refinement using bilateral, or compound, matching with one or more warped refinement models 900 includes accessing a flag (at 910), determining whether to use warped refinement (at 915), obtaining a refined prediction block (at 920), generating a reconstructed block (at 930), and output (at 940). Decoding including motion refinement using bilateral, or compound, matching with one or more warped refinement models 900 may include other aspects of decoding that are omitted from the description herein for simplicity.

The decoder accesses, or otherwise obtains, from the encoded bitstream, a value indicating the use of motion refinement based on bilateral, or compound, matching with one or more warped refinement models for decoding the current block (at 910). For example, the value may be a flag, one or more bits, or one or more symbols, such as included in a sequence parameter set, a picture parameter set, a frame header, a block header, or another unit of encoded, or compressed, image or video data. Accessing the flag, or value, is shown with a broken line border to indicate that, in some implementations, accessing the value (at 910) may be omitted, excluded, or skipped.

Encoding including motion refinement using bilateral, or compound, matching with one or more warped refinement models may include signaling, in the encoded bitstream, such as in a sequence parameter set, a picture parameter set, a frame header, a block header, or another unit of encoded, or compressed, image or video data, the value, such as a bit, a flag, syntax element, or a symbol, indicating the use of motion refinement based on bilateral, or compound, matching with one or more warped refinement models for the current block. In some implementations, signaling, in the encoded bitstream, the value indicating the use of motion refinement based on bilateral, or compound, matching with one or more warped refinement models for the current block may be omitted or skipped.

Whether to use motion refinement using bilateral, or compound, matching with one or more warped refinement models is determined (at 915).

For example, in decoding including motion refinement using bilateral, or compound, matching with one or more warped refinement models, the decoder determines whether to use motion refinement using bilateral, or compound, matching with one or more warped refinement models (at 915). For example, the decoder may determine to use motion refinement using bilateral, or compound, matching with one or more warped refinement models (at 915) in accordance with, or in response to, the value indicating the use of motion refinement based on bilateral, or compound, matching with one or more warped refinement models for decoding the current block (obtained at 910). In some implementations, accessing the value (at 910) may be omitted and whether to use motion refinement based on bilateral, or compound, matching with one or more warped refinement models for decoding the current block may be determined (at 915) based on one or more rules or configurations. In some implementations, the value, or flag, may indicate that the use of motion refinement based on bilateral, or compound, matching with one or more warped refinement models is available, or enabled, for decoding the current block and whether to use motion refinement based on bilateral, or compound, matching with one or more warped refinement models for decoding the current block may be determined (at 915) based on one or more rules or configurations.

In another example, in encoding including motion refinement using bilateral, or compound, matching with one or more warped refinement models, the encoder determines whether to use motion refinement using bilateral, or compound, matching with one or more warped refinement models (at 915), such as based on rate-distortion optimization.

Decoding including motion refinement using bilateral, or compound, matching with one or more warped refinement models 900 includes obtaining the refined prediction block (at 920), such as in response to the value indicating the use of motion refinement based on bilateral, or compound, matching with one or more warped refinement models for decoding the current block, such as in response to a determination (at 915) that the flag (obtained at 910) indicates the use of motion refinement based on bilateral, or compound, matching with one or more warped refinement models for decoding the current block.

Encoding including motion refinement using bilateral, or compound, matching with one or more warped refinement models includes obtaining the refined prediction block (at 920).

Obtaining the refined prediction block (at 920) includes obtaining a warped refinement model (at 950), obtaining coarse motion vectors (at 960), obtaining coarse prediction blocks and gradients (at 970), obtaining block based refined motion vectors (at 980), and obtaining subblock based refined translational motion vectors (at 990). In some implementations, obtaining subblock based refined translational motion vectors (at 990) may be omitted as indicated by the broken line border.

Obtaining the refined prediction block (at 920) includes using the warped refinement model and previously obtained reference frame data, such as in the absence (absent), or unavailability, of data expressly indicating, or signaling, the refined motion vectors in the encoded bitstream, to obtain the refined motion vectors.

Encoding including motion refinement using bilateral, or compound, matching with one or more warped refinement models may omit, or exclude, data expressly indicating, or signaling, the refined motion vectors from the encoded bitstream.

Obtaining the warped refinement model (at 950) includes obtaining the warped refinement model from available warped refinement models. In some implementations, the available warped refinement models include a four-parameter scaling refinement model (having at least four parameters), a three-parameter scaling refinement model, and a four-parameter rotational refinement model (having at least four parameters). Other warped refinement models may be used.

Obtaining the warped refinement model (at 950) includes using a warped refinement model, or a combination of warped refinement models, such as in bilateral, or compound, matching, to refine motion vectors. Refining the motion vectors may include using a combination, such as a sequential combination, of the warped refinement models. The aspects and elements of Coding using motion refinement using bilateral, or compound, matching with a warped motion model, such as decoding including motion refinement using bilateral, or compound, matching with one or more warped refinement models 900 or encoding including motion refinement using bilateral, or compound, matching with one or more warped refinement models (not expressly shown), may be performed in sequences, combinations, or both, not expressly described herein, except as is described herein or as is otherwise clear from context.

In some implementations, obtaining the warped refinement model (at 950) includes identifying a target warped motion mode for decoding the current block and obtaining the warped refinement model in accordance with the target warped motion mode for decoding the current block.

For example, obtaining the warped refinement model (at 950) may include identifying a six-parameter warped motion mode as a target warped motion mode for decoding the current block, and, in response to identifying the six-parameter warped motion mode as the target warped motion mode for decoding the current block, identifying the four-parameter scaling refinement model as the warped refinement model.

In another example, obtaining the warped refinement model (at 950) may include identifying a warped motion mode having four or more parameters, such as a similarity warped motion model that includes four-parameters, or another warped motion model including four or more parameters, as the target warped motion mode for decoding the current block, and, in response to identifying the warped motion mode having four or more parameters as the target warped motion mode for decoding the current block, identifying the three-parameter scaling refinement model as the warped refinement model.

In another example, obtaining the warped refinement model (at 950) may include identifying a warped motion mode having four or more parameters, such as a similarity warped motion model that includes four-parameters, or another warped motion model including four or more parameters, as the target warped motion mode for decoding the current block, and, in response to identifying the warped motion mode having four or more parameters as the target warped motion mode for decoding the current block, identifying the four-parameter rotational refinement model as the warped refinement model.

Coding using motion refinement using bilateral, or compound, matching with a warped motion model, such as decoding including motion refinement using bilateral, or compound, matching with one or more warped refinement models 900 or encoding including motion refinement using bilateral, or compound, matching with one or more warped refinement models (not expressly shown), may include using a warped refinement model ($V_x$, $V_y$), such as an affine model, that indicates scaling in the x, or horizontal, direction ($S_x$), scaling in the y, or vertical, direction ($S_y$), a rotation angle (ϕ), a shearing factor (k), and translational motion ($V_{Tx}$, $V_{Ty}$), which may be expressed as follows:

$$\begin{pmatrix} V_x \\ V_y \end{pmatrix} = \begin{pmatrix} \cos(\phi) & -\sin(\phi) \\ \sin(\phi) & \sin(\phi) \end{pmatrix} \cdot \begin{pmatrix} 1 & k \\ 0 & 1 \end{pmatrix} \cdot \begin{pmatrix} S_x & 0 \\ 0 & S_y \end{pmatrix} + \begin{pmatrix} V_{Tx} \\ V_{Ty} \end{pmatrix}.$$

The rotation angle (ϕ) and the shearing factor (k) may be linearly proportional to the temporal distance between the current frame and the respective reference frames (d0, d1). Scaling in the in the x, or horizontal, direction ($S_x$), and in the y, or vertical, direction ($S_y$), may be exponentially proportional to the temporal distance between the current frame and the respective reference frames (d0, d1).

The temporal distances between the reference frames and the current frame may be obtained by obtaining, such as calculating, a first temporal distance (d0) and a second temporal distance (d1) from the reference frames to the current frame, wherein d>0 represents forward reference (preceding in display order), and d<0 represents backward reference (subsequent in display order).

The coarse motion vectors are obtained (at 960).

Obtaining the coarse motion vectors (at 960) includes obtaining a forward coarse motion vector (($a_0$, $b_0$) or $MV_0$) for the current block with respect to a portion of a forward reference frame temporally preceding the current frame in display order, such as the first reference frame 720 shown in FIG. 7 temporally preceding the current frame 710 shown in FIG. 7, obtained from the forward reference picture list (L0). The forward reference frame has a first temporal distance (d0) from the current frame.

Obtaining the coarse motion vectors (at 960) includes obtaining a backward coarse motion vector (($a_1$,$b_1$) or $MV_1$) for the current block with respect to a portion of a backward reference frame temporally subsequent to the current frame in display order, such as the second reference frame 730 shown in FIG. 7 temporally subsequent to the current frame 710 shown in FIG. 7, obtained from the backward reference picture list (L1). The backward reference frame has a second temporal distance (d1) from the current frame. In some implementations, the second temporal distance (d1) matches the first temporal distance (do).

For simplicity, the forward coarse motion vector ($d_0$, $b_0$) and the backward coarse motion vector ($a_1$,$b_1$) may be collectively referred to as a coarse motion vector pair.

The coarse prediction blocks are obtained (at 970) in accordance with the coarse motion vector pair (obtained at 960), such as using motion compensation.

Obtaining the prediction blocks (at 970) includes obtaining a forward coarse prediction block ($P_0$($a_0$, $b_0$) or $P_0$) from a portion of the forward reference frame indicated by the forward coarse motion vector ($a_0$, $b_0$).

Obtaining the coarse prediction blocks (at 970) includes obtaining a backward coarse prediction block ($P_1$($a_1$, $b_1$) or $P_1$) from a portion of the backward reference frame indicated by the backward coarse motion vector ($a_1$, $b_1$).

The gradients are obtained (at 970) in accordance with the coarse motion vector pair (obtained at 960).

Obtaining, such as generating, the gradients (at 970) includes obtaining one or more gradients in accordance with the coarse prediction blocks ($P_0$, $P_1$).

For example, obtaining the gradients (at 970) may include obtaining a forward horizontal spatial gradient ($G_{0x}$) of the forward coarse prediction block ($P_0$($a_0$, $b_0$)) in the x, or horizontal, direction, obtaining a forward vertical spatial gradient ($G_{1x}$) of the forward coarse prediction block ($P_0$($a_0$,$b_0$)) in the y, or vertical, direction, obtaining a backward horizontal spatial gradient ($G_{1x}$) of the backward translational prediction block ($P_1$($a_1$,$b_1$)) in the x, or horizontal, direction, and obtaining a backward vertical spatial gradient ($G_{1y}$) of the backward translational prediction block ($P_1$($a_1$, $b_1$)) is obtained in the y, or vertical, direction.

In some implementations, the gradients may be obtained using bicubic interpolation.

In some implementations, the prediction block size may be relatively large, such as larger than 16×16, and the sizes of the gradient arrays (Gx0, Gy0, Gx1, Gy1) may be reduced, such as using average pooling, which may reduce the complexity of parameter derivation. For example, a prediction block may have a first width (W) and a first height (H), the gradients (Gx0, Gy0, Gx1, Gy1) may be obtained having the first width (W) and the first height (H), the gradients (Gx0, Gy0, Gx1, Gy1) may be, respectively, divided into proper subregions having a second width (w), which is less than or equal to the first width (w<=W), wherein the second width (w) is a factor of the first width (W), and a second height (h), which is less than or equal to the first height (h<=H), wherein the second height (h) is a factor of the first height (H), and an average gradient value within the respective subregions may be obtained as the gradients (Gx0, Gy0, Gx1, Gy1), having the second width (w), such as sixteen, and the second height (h), such as sixteen.

The block based refined motion vectors are obtained (at 980).

In some implementations, obtaining the block based refined motion vectors (at 980) includes obtaining a block based refined control point motion vector for the top-left corner of a current block (Mv0), a block based refined control point motion vector for the top-right corner of the current block (Mv1), and a block based refined control point motion vector for the bottom-left corner of the current block (Mv2).

Coding using motion refinement using bilateral, or compound, matching with a warped motion model, such as decoding including motion refinement using bilateral, or compound, matching with one or more warped refinement models 900 or encoding including motion refinement using bilateral, or compound, matching with one or more warped refinement models (not expressly shown) includes obtaining refined prediction blocks in accordance with the block based refined motion vectors (at 980).

In some implementations, the motion trajectory is continuous, or constructively continuous, and obtaining the refined prediction blocks (at 980) includes obtaining a forward refined prediction block ($P_0(V_{x0}, V_{y0})$ or $P_0'$) and a backward refined prediction block ($P_1(V_{x1}, V_{y1})$ or $P_1'$), which may have mirror symmetry relative to the current frame.

In some implementations, the coarse motion vector pair (($a_0$, $b_0$) and ($a_1$, $b_1$)) may be close to, such as within a defined threshold of, the top-left control point motion vector ($V_{x0}$), $V_{y0}$) and the top-right control point motion vector ($V_{x1}$, $V_{y1}$), a forward motion vector difference ($dV_{0x}$, $dV_{0y}$) may be obtained relative to the forward coarse motion vector ($a_0$, $b_0$), a backward motion vector difference ($dV_{1x}$, $dV_{1y}$) may be obtained relative to the backward coarse motion vector ($a_1$, $b_1$), and approximating the forward refined prediction block ($P_0(V_{x0}, V_{y0})$ or $P_0'$) and the backward refined prediction block ($P_1(V_{x1}, V_{y1})$ or $P_1'$) may be expressed as the following:

$$P_0(V_{x0}, V_{y0}) = P_0(a_0, b_0) + G_{0x} \cdot dV_{0x} + G_{0y} \cdot dV_{0y},$$

$$P_1(V_{x1}, V_{y1}) = P_1(a_1, b_1) + G_{1x} \cdot dV_{1x} + G_{1y} \cdot dV_{1y}.$$

The motion vector differences may be subjective to the affine model described herein.

In implementations wherein the refined prediction blocks have mirror symmetry relative to the current frame, the mirror symmetry indicates the affine model used by the forward motion vector difference ($dV_{0x}$, $dV_{0y}$) and the backward motion vector difference ($dV_{1x}$, $dV_{1y}$). The rotation angle (ϕ) and shearing factor (k) at the references may be mirrored about zero (0), and the scaling factors ($S_x$, $S_y$) at the references may be reciprocal. The affine model may be derived by minimizing the sum of squared error between $P_0(V_{x0}, V_{y0})$ and $P_1(V_{x1}, V_{y1})$. The minimization may be solved by an equation, such as the Wiener-Hopf equation.

In some implementations, the sine, the cosine, and the reciprocal may be non-linear, such that a solution to the Wiener-Hopf equation may be unavailable.

In an example, the scaling factor(S) with respect to the forward reference picture list (L0) may be a result of adding one to the scaling parameter(s), which may be expressed as S=1+s, and an approximation of the scaling factor (1/S) with respect to the backward reference picture list (L1) may be a result of subtracting the scaling parameter(s) from one, which may be expressed as 1/S=1−s.

In some implementations, the warped refinement model is the three-parameter scaling refinement model, wherein the rotation angle (ϕ) is zero, or constructively zero, the shearing factor (k) is zero, or constructively zero, and non-scaling warped motion is constructively omitted, excluded, or ignored, obtaining the refined motion vectors (at 980) includes obtaining a scaling factor for the x, or horizontal, direction and the y, or vertical, direction. The three-parameter scaling refinement model may be expressed as the following:

$$V_{0x} = s \cdot x + V_{Tx},$$

$$V_{0y} = s \cdot y + V_{Ty},$$

$$V_{1x} = -s \cdot x - V_{Tx},$$

$$V_{1y} = -s \cdot y - V_{Ty}.$$

The refined motion vector of the top-left corner of the forward refined prediction block ($P_0(V_{x0}, V_{y0})$ or $P_0'$) may be expressed as ($V_{00x}$, $V_{00y}$), the refined motion vector of the top-right corner of the forward refined prediction block ($P_0(V_{x0}, V_{y0})$ or $P_0'$) may be expressed as ($V_{01x}$, $V_{01y}$), the refined motion vector of the top-left corner of the backward refined prediction block ($P_1(V_{x1}, V_{y1})$ or $P_1'$) may be expressed as ($V_{10x}$, $V_{10y}$), the refined motion vector of the top-right corner of the backward refined prediction block ($P_1(V_{x1}, V_{y1})$ or $P_1'$) may be expressed as ($V_{11x}$, $V_{11y}$), and the three-parameter scaling refinement model may be expressed as the following:

$$V_{0x} = (V_{01x} - V_{00x})/w \cdot x + V_{00x},$$

$$V_{0y} = (V_{01x} - V_{00x})/w \cdot y + V_{00y},$$

$$V_{1x} = -(V_{01x} - V_{00x})/w \cdot x - V_{00x},$$

$$V_{1y} = -(V_{01x} - V_{00x})/w \cdot y - V_{00y}.$$

The three-parameter scaling refinement model includes three independent parameters ($V_{00x}$, $V_{00y}$, and $V_{01x}$). Obtaining, determining, or deriving, other values of the refined motion vectors may be expressed as the following:

$$V_{01y} = V_{00y},$$

$$V_{10x} = -V_{00x},$$

$$V_{10y} = -V_{00x},$$

$$V_{11x} = -V_{01x},$$

-continued $$V_{11y} = -V_{01y}.$$

Determining the refined motion vectors (at 980) using the three-parameter scaling refinement model may be expressed as the following:

$$(V_{00x}, V_{00y}, V_{01x}) = \text{argmin}\{((P_0(a_0, b_0) + G_{0x} \cdot ((V_{01x} - V_{00x})/w \cdot x + V_{00x}) + G_{0y} \cdot ((V_{01x} - V_{00x})/w \cdot y + V_{00y}) - ((P_1(a_1, b_1) + G_{1x} \cdot (-(V_{01x} - V_{00x})/w \cdot x - V_{00x}) + G_{1y} \cdot (-(V_{01x} - V_{00x})/w \cdot y - V_{00y})))^2\}.$$

In some implementations, the warped refinement model is the four-parameter scaling refinement model, which is similar to the three-parameter scaling refinement model, except as is described herein or as is otherwise clear from context. For example, the scaling factors for the four-parameter scaling refinement model differ from the scaling factors for the three-parameter scaling refinement model.

Determining the refined motion vectors (at 980) using the four-parameter scaling refinement model may be expressed as the following:

$$V_{1x} = (V_{01x} - V_{00x})/w \cdot x - V_{00x},$$

$$V_{1y} = (V_{02y} - V_{00y})/h \cdot y - V_{00y},$$

$$V_{1x} = -(V_{01x} - V_{00x})/w \cdot x - V_{00x},$$

$$V_{1y} = -(V_{02y} - V_{00y})/h \cdot y - V_{00y},$$

$$V_{01y} = V_{00y},$$

$$V_{02x} = V_{00x}.$$

The four-parameter scaling refinement model uses three refined motion vectors. The four-parameter scaling refinement model may be available in the six-parameter affine model through two parameters ($V_{01y}=V_{00y}$, and $V_{02x}=V_{00x}$), which may be non-independent.

In some implementations, the warped refinement model is the four-parameter rotational refinement model, and scaling and shearing may be omitted, excluded, or ignored. The four-parameter rotational refinement model may be expressed as the following:

$$V_{0x} = (V_{01x} - V_{00x})/w \cdot x - (V_{01y} - V_{00y})/w \cdot y + V_{00x},$$

$$V_{0y} = (V_{01y} - V_{00y})/w \cdot x + (V_{01x} - V_{00x})/w \cdot y + V_{00y},$$

$$V_{1x} = (V_{01x} - V_{00x})/w \cdot x - (V_{01y} - V_{00y})/w \cdot y - V_{00x},$$

$$V_{1y} = (V_{01y} - V_{00y})/w \cdot x - (V_{01x} - V_{00x})/w \cdot y - V_{00y}.$$

Obtaining the refined prediction blocks (at 980) includes determining, obtaining, or generating, the refined prediction blocks (forward and backward) in accordance with the refined motion vectors.

In some implementations, obtaining the refined prediction block (at 920) may include multiple iterations of obtaining coarse motion vectors (at 960), obtaining coarse prediction blocks and gradients (at 970), and obtaining block based refined motion vectors (at 980), as indicated by the broken directional line (a 995) from obtaining block based refined motion vectors (at 980) to obtaining coarse motion vectors (at 960). In iterations subsequent to a first iteration, obtaining the coarse motion vectors (at 960) includes using the refined motion vectors obtained in an immediately preceding iteration as the coarse motion vectors.

A maximum number, count, or cardinality of iterations, such as three, may be defined, such as at the encoder and the decoder in the absence of signaling, or may be signaled in bitstreams, such as in a sequence parameter set, a picture parameter set, a picture header, or a slice header. The maximum number, count, or cardinality of iterations may be refinement model specific.

In some implementations, iterations may include determining whether to perform a subsequent iteration, or a current iteration, such as in accordance with one or more defined conditions. For example, the absolute difference between the refined motion vectors and the coarse motion vectors in an iteration may be below a minimum difference threshold and the encoder, or decoder, may determine to omit or exclude subsequent iterations, or subsequent portions of a current iteration. The minimum difference threshold may be defined, such as at the encoder and the decoder in the absence of signaling, or may be signaled in the bitstream.

In some implementations, multiple candidate coarse motion vector pairs may be obtained (at 960) for the current block and Coding using motion refinement using bilateral, or compound, matching with a warped motion model, such as decoding including motion refinement using bilateral, or compound, matching with one or more warped refinement models 900 or encoding including motion refinement using bilateral, or compound, matching with one or more warped refinement models (not expressly shown) may include obtaining candidate refined motion vectors on a per-candidate coarse motion vector pair basis. For simplicity, a candidate coarse motion vector pair for which corresponding candidate refined motion vectors have been obtained may be referred to herein as a processed candidate coarse motion vector pair. Coding using motion refinement using bilateral, or compound, matching with a warped motion model, such as decoding including motion refinement using bilateral, or compound, matching with one or more warped refinement models 900 or encoding including motion refinement using bilateral, or compound, matching with one or more warped refinement models (not expressly shown) may include obtaining optimal candidate refined motion vectors from among the processed candidate coarse motion vector pairs as the refined motion vectors, such as by minimizing cost, such as sum of absolute differences (SAD).

In some implementations, obtaining coarse motion vectors (at 960) may include determining whether to use a candidate coarse motion vector pair. Determining whether to use a candidate coarse motion vector pair may include determining whether a maximum absolute difference between the candidate coarse motion vector pair and at least one processed candidate coarse motion vector pairs is less than or equal to a minimum difference threshold, such as a one-pixel difference for a component of a motion vector. In response to determining, or a determination, that the maximum absolute difference between the candidate coarse motion vector pair and at least one processed candidate coarse motion vector pairs is less than or equal to the minimum difference threshold, the candidate coarse motion vector pair ignored, pruned, or skipped. The minimum difference threshold may be defined, such as at the encoder and the decoder in the absence of signaling, or may be signaled in bitstreams.

In some implementations, obtaining block based refined motion vectors (at 980) may include determining whether the maximum distance between the refined motion vectors and the coarse motion vector pair is greater than a maximum distance threshold, such as two pixels. In response to determining, or a determination, that the maximum distance between the refined motion vectors and the coarse motion vector pair is greater than the maximum distance threshold, use of the refined motion vectors may be omitted, skipped, excluded, or avoided. The maximum distance threshold may be defined, such as at the encoder and the decoder in the absence of signaling, or may be signaled in bitstream.

Although not shown expressly in FIG. 9, in some implementations, Coding using motion refinement using bilateral, or compound, matching with a warped motion model, such as decoding including motion refinement using bilateral, or compound, matching with one or more warped refinement models 900 or encoding including motion refinement using bilateral, or compound, matching with one or more warped refinement models (not expressly shown) may include determining whether to perform prediction refinement with optical flow, such as the prediction refinement with optical flow 800 shown in FIG. 8. For example, prediction refinement with optical flow may be omitted, skipped, or avoided in response to a determination that prediction refinement with optical flow is disabled, or unavailable, in accordance with Coding using motion refinement using bilateral, or compound, matching with a warped motion model, such as decoding including motion refinement using bilateral, or compound, matching with one or more warped refinement models 900 or encoding including motion refinement using bilateral, or compound, matching with one or more warped refinement models (not expressly shown). The determination that prediction refinement with optical flow is disabled, or unavailable, in accordance with Coding using motion refinement using bilateral, or compound, matching with a warped motion model, such as decoding including motion refinement using bilateral, or compound, matching with one or more warped refinement models 900 or encoding including motion refinement using bilateral, or compound, matching with one or more warped refinement models (not expressly shown) may be based on a defined rule, signaling in the bitstream, or a combination thereof.

In some implementations, a defined weighting, such as (½,½), may be used as bi-prediction with coding unit based weighting corresponding to the refined motion vectors.

In some implementations, a defined, such as at the encoder and the decoder in the absence of signaling, or signaled, value, such as false, may be used for a flag, bit, or symbol, indicating illumination compensation corresponding to the refined motion vectors.

Although not shown expressly in FIG. 9, in some implementations, Coding using motion refinement using bilateral, or compound, matching with a warped motion model, such as decoding including motion refinement using bilateral, or compound, matching with one or more warped refinement models 900 or encoding including motion refinement using bilateral, or compound, matching with one or more warped refinement models (not expressly shown) may include determining whether to perform bilateral-matching (BM) based decoder-side motion vector refinement for translational motion, such as the bilateral-matching (BM) based decoder-side motion vector refinement 700 for translational motion shown in FIG. 7. For example, bilateral-matching (BM) based decoder-side motion vector refinement for translational motion may be omitted, skipped, or avoided in response to a determination that bilateral-matching (BM) based decoder-side motion vector refinement for translational motion is disabled, or unavailable, in accordance with Coding using motion refinement using bilateral, or compound, matching with a warped motion model, such as decoding including motion refinement using bilateral, or compound, matching with one or more warped refinement models 900 or encoding including motion refinement using bilateral, or compound, matching with one or more warped refinement models (not expressly shown). The determination that bilateral-matching (BM) based decoder-side motion vector refinement for translational motion is disabled, or unavailable, in accordance with Coding using motion refinement using bilateral, or compound, matching with a warped motion model, such as decoding including motion refinement using bilateral, or compound, matching with one or more warped refinement models 900 or encoding including motion refinement using bilateral, or compound, matching with one or more warped refinement models (not expressly shown) may be based on a defined rule, signaling in the bitstream, or a combination thereof. For example, a flag, bit, or symbol, may be signaled to indicate whether bilateral-matching (BM) based decoder-side motion vector refinement for translational motion is used and Coding using motion refinement using bilateral, or compound, matching with a warped motion model, such as decoding including motion refinement using bilateral, or compound, matching with one or more warped refinement models 900 or encoding including motion refinement using bilateral, or compound, matching with one or more warped refinement models (not expressly shown) is disabled, or unavailable, Coding using motion refinement using bilateral, or compound, matching with a warped motion model, such as decoding including motion refinement using bilateral, or compound, matching with one or more warped refinement models 900 or encoding including motion refinement using bilateral, or compound, matching with one or more warped refinement models (not expressly shown) is used and bilateral-matching (BM) based decoder-side motion vector refinement for translational motion is disabled, or unavailable, or, Coding using motion refinement using bilateral, or compound, matching with a warped motion model, such as decoding including motion refinement using bilateral, or compound, matching with one or more warped refinement models 900 or encoding including motion refinement using bilateral, or compound, matching with one or more warped refinement models (not expressly shown) and bilateral-matching (BM) based decoder-side motion vector refinement for translational motion are used.

In some implementations, bilateral-matching (BM) based decoder-side motion vector refinement for translational motion is used to obtain translational refined motion vectors and a corresponding first matching cost, Coding using motion refinement using bilateral, or compound, matching with a warped motion model, such as decoding including motion refinement using bilateral, or compound, matching with one or more warped refinement models 900 or encoding including motion refinement using bilateral, or compound, matching with one or more warped refinement models (not expressly shown) is used to obtain refined motion vectors a corresponding second matching cost, the minimal matching cost among the first matching cost and the second matching cost is determined, and the motion vectors corresponding to the minimal matching cost is used as the refined motion vectors for the current block. In some implementations, the first matching cost may match the second matching cost and whether to use bilateral-matching (BM) based decoder-side motion vector refinement for translational motion or Coding using motion refinement using bilateral, or compound, matching with a warped motion model, such as decoding including motion refinement using bilateral, or compound, matching with one or more warped refinement models 900 or encoding including motion refinement using bilateral, or compound, matching with one or more warped refinement models (not expressly shown) is defined, such as at the encoder, the decoder, or both.

Coding using motion refinement using bilateral, or compound, matching with a warped motion model, such as decoding including motion refinement using bilateral, or compound, matching with one or more warped refinement models 900 or encoding including motion refinement using bilateral, or compound, matching with one or more warped refinement models (not expressly shown), may be used in combination with one or more coding modes that include bilateral, or compound, prediction.

For example, Coding using motion refinement using bilateral, or compound, matching with a warped motion model, such as decoding including motion refinement using bilateral, or compound, matching with one or more warped refinement models 900 or encoding including motion refinement using bilateral, or compound, matching with one or more warped refinement models (not expressly shown), may be used to refine motion vectors from a merge candidate wherein the coding mode is merge mode. In merge mode, motion information for the current block is obtained from, or based on, motion information from one or more previously coded neighboring blocks (merge candidates) in the absence of expressly signaled motion information for the current block. The merge candidates may be indexed, such as in a merge candidate list, and an index value of the merge candidate used for coding the current block may be signaled in the encoded bitstream.

In some implementations, the coding mode may be merge mode, the coarse motion vectors obtained from the merge candidate may be translational motion vectors, the index value of a merge candidate, such as regular merge candidates, merge mode with motion vector difference merge candidates, or both, may be signaled in the encoded bitstream, and Coding using motion refinement using bilateral, or compound, matching with a warped motion model, such as decoding including motion refinement using bilateral, or compound, matching with one or more warped refinement models 900 or encoding including motion refinement using bilateral, or compound, matching with one or more warped refinement models (not expressly shown) may be used to refine motion vectors from the merge candidate corresponding to the signaled merge candidate index value in merge mode.

In some implementations, the coding mode may be merge mode, the coarse motion vectors obtained from the merge candidate may be translational motion vectors, and Coding using motion refinement using bilateral, or compound, matching with a warped motion model, such as decoding including motion refinement using bilateral, or compound, matching with one or more warped refinement models 900 or encoding including motion refinement using bilateral, or compound, matching with one or more warped refinement models (not expressly shown) may include obtaining, based on coarse motion vectors obtained from a merge candidate, refined motion vectors that are warped motion vectors.

In some implementations, the coding mode may be merge mode, the coarse motion vectors obtained from the merge candidate may be translational motion vectors, Coding using motion refinement using bilateral, or compound, matching with a warped motion model, such as decoding including motion refinement using bilateral, or compound, matching with one or more warped refinement models 900 or encoding including motion refinement using bilateral, or compound, matching with one or more warped refinement models (not expressly shown) may include obtaining, based on coarse motion vectors obtained from a merge candidate, refined motion vectors that are translational motion vectors, and the merge candidate and the corresponding refined motion vectors may be identified as available for use in subsequent warped motion prediction.

In some implementations, the coding mode may be merge mode, the coarse motion vectors obtained from the merge candidate may be translational motion vectors, Coding using motion refinement using bilateral, or compound, matching with a warped motion model, such as decoding including motion refinement using bilateral, or compound, matching with one or more warped refinement models 900 or encoding including motion refinement using bilateral, or compound, matching with one or more warped refinement models (not expressly shown) may include obtaining, based on coarse motion vectors obtained from a merge candidate, refined motion vectors that are translational motion vectors, the refined motion vectors may be identified as unavailable for use in subsequent motion prediction, and coarse motion vectors obtained from the merge candidate may be identified as available for use in subsequent motion prediction.

In some implementations, the coding mode is merge mode, the coarse motion vectors obtained from the merge candidate are translational motion vectors, and the refined motion vectors are included in a merge candidate list, such as a subblock merge candidate list or a warped merge candidate list. In some implementations, the refined motion vectors are translational motion vectors and are omitted, or excluded, from the merge candidate list, such as from the subblock merge candidate list or the warped merge candidate list.

In some implementations, the coding mode is merge mode, such as subblock merge mode or warped merge mode, the coarse motion vectors obtained from the merge candidate are warped motion vectors, and Coding using motion refinement using bilateral, or compound, matching with a warped motion model, such as decoding including motion refinement using bilateral, or compound, matching with one or more warped refinement models 900 or encoding including motion refinement using bilateral, or compound, matching with one or more warped refinement models (not expressly shown) may be used to refine the warped coarse motion vectors. In an example, the coarse motion vectors are four-parameter warped motion vectors, and the available warped refinement models include the three-parameter scaling refinement model, the four-parameter rotational refinement model, or both.

In some implementations, the coding mode is merge mode, such as subblock merge mode or warped merge mode, the coarse motion vectors obtained from the merge candidate are warped motion vectors, and obtaining the warped refinement model (at 950) includes obtaining the warped refinement model from the available warped refinement models in accordance with, or in response to, the warped motion model corresponding to the coarse motion vector pair. For example, the warped motion model corresponding to the coarse motion vector pair may be a four-parameter warped motion model, and the three-parameter scaling refinement model may be used in the refinement. In another example, the warped motion model corresponding to the coarse motion vector pair may be a six-parameter warped model, and the four-parameter scaling refinement model may be used.

In some implementations, obtaining the refined prediction block (at 920) may include obtaining translational and rotational parameters using the four-parameter rotational refinement model. In some implementations, scaling parameters may be unavailable using the four-parameter rotational refinement model in the absence of using a scaling refinement model, such as the three-parameter scaling refinement model or the four-parameter scaling refinement model.

In some implementations, obtaining the refined prediction block (at 920) may include obtaining translational and scaling parameters using the three-parameter scaling refinement model or the four-parameter scaling refinement model. Rotational parameters may be unavailable using the three-parameter scaling refinement model or the four-parameter scaling refinement model in the absence of using a rotational refinement model, such as the four-parameter rotational refinement model.

In some implementations, obtaining the refined prediction block (at 920) may include obtaining rotational parameters and scaling parameters using a multi-stage process, or pipeline. In a multi-stage process, or pipeline, obtaining the refined prediction block (at 920) may include obtaining translational and rotational parameters using the four-parameter rotational refinement model, obtaining translational and scaling parameters using the three-parameter scaling refinement model or the four-parameter scaling refinement model, and obtaining the refined prediction block (at 920) may include combining the translational and rotational parameters obtained using the four-parameter rotational refinement model with the translational and scaling parameters may be obtained using the three-parameter scaling refinement model or the four-parameter scaling refinement model.

For example, translational and rotational parameters obtained using the four-parameter rotational refinement model, gradients (distinct from gradients obtained using the four-parameter rotational refinement model) may be obtained, such as computed, based on, such as using, the translational and rotational parameters obtained using the four-parameter rotational refinement model, translational and scaling parameters may be obtained using the three-parameter scaling refinement model (or the four-parameter scaling refinement model) based on, such as using, the gradients obtained based on the translational and rotational parameters obtained using the four-parameter rotational refinement model, the translational and rotational parameters obtained using the four-parameter rotational refinement model may be combined with the translational and scaling parameters may be obtained using the three-parameter scaling refinement model (or the four-parameter scaling refinement model), and the combined parameters (prediction) may be further refined.

In some implementations, to reduce complexity, resource utilization, or both, relative to the multi-stage process, or pipeline, which combines parameters obtained using the four-parameter rotational refinement model with parameters obtained using the three-parameter scaling refinement model (or the four-parameter scaling refinement model), obtaining the warped refinement model (at 950) may include obtaining a rotational and scaling refinement model as the warped refinement model.

In the rotational and scaling refinement model, shearing may be omitted, excluded, or ignored.

In the rotational and scaling refinement model, rotational parameters, scaling parameters (in x and in y), and translational parameters may be obtained.

In the rotational and scaling refinement model, the rotation angle ($\theta\Delta t$) is linearly proportional to the temporal distance ($\Delta t$) between the respective reference frame and the current frame.

In the rotational and scaling refinement model, the translational parameters ($tx\Delta t$ and $ty\Delta t$) are linearly proportional to the temporal distance ($\Delta t$) between the respective reference frame and the current frame.

In the rotational and scaling refinement model, the scaling factor is exponentially proportional to the temporal distance ($\Delta t$) between the respective reference frame and the current frame. The scaling factors may be expressed as the following:

$$(1+s_x)^{\Delta t} \text{ and } (1+s_y)^{\Delta t}.$$

In the rotational and scaling refinement model, the scaling parameters ($s_x$ and $s_y$) are relatively small, such that the scaling factors may be approximated, which may be expressed as the following:

$$1+s_x\Delta t \text{ and } 1+s_y\Delta t.$$

In the rotational and scaling refinement model, the rotation angle is relatively small, such that the cosine thereof ($\cos(\theta\Delta t)$) may be approximated as one (1) and the sine thereof ($\sin(\theta\Delta t)$) may be approximated as $\theta\Delta t$, which avoids nonlinear operations.

In the rotational and scaling refinement model, a rotational parameter ($\theta$) is obtained.

The warped model (x, y)→(x', y'), indicating warped motion from the horizontal component of the coarse motion vector (x) and the vertical component of the coarse motion vector (y) to the horizontal component of the refined motion vector (x') and the vertical component of the refined motion vector (y'), may be expressed as the following:

$$\begin{aligned} x' &= \cos(\theta\Delta t)(1+s_x\Delta t)x - \sin(\theta\Delta t)(1+s_y\Delta t)y + t_x\Delta t \approx \\ &\quad (1+s_x\Delta t)x - \theta\Delta t(1+\alpha s_y\Delta t)y + t_x\Delta t, \\ y' &= \sin(\theta\Delta t)(1+s_x\Delta t)x + \cos(\theta\Delta t)(1+s_y\Delta t)y + t_y\Delta t \approx \\ &\quad (1+s_x\Delta t)x + \theta\Delta t(1+s_y\Delta t)y + t_y\Delta t. \end{aligned}$$

In the rotational and scaling refinement model, the scaling parameters ($s_x$ and $s_y$) and the rotational parameter ($\theta$) are relatively small, and the second order terms with the products thereof may be omitted, disregarded, ignored, or dropped, which may be expressed as the following:

$$x' \approx (1+s_x\Delta t)x - (\theta\Delta t)y + t_x\Delta t, \qquad \text{[Equation 6]}$$

-continued $$y' \approx (\theta\Delta t)x + (1 + s_y\Delta t)y + t_y\Delta t, \quad \text{[Equation 7]}$$

$$\frac{\Delta x}{\Delta t} = \frac{x' - x}{\Delta t} \approx s_x x - \theta y + t_x, \quad \text{[Equation 8]}$$

$$\frac{\Delta y}{\Delta t} = \frac{y' - y}{\Delta t} \approx \theta x + s_y y + t_y. \quad \text{[Equation 9]}$$

Equation 8 and Equation 9 are linearly related to the unknown parameters ($\theta$, $s_x$, $s_y$, $t_x$, $t_y$). Equation 8 and Equation 9 may be included in the optical flow equation, such as Equation 1, which may be solved to obtain the parameters using a five-dimensional inverse autocorrelation problem.

The optical flow equation, with respect to intensity, such as (I), such as luma or luminance values, may be expressed as the following:

$$0 = \frac{\partial I}{\partial t} + \left(\frac{\partial x}{\partial t}\right)\left(\frac{\partial I}{\partial x}\right) + \left(\frac{\partial y}{\partial t}\right)\left(\frac{\partial I}{\partial y}\right).$$

In some implementations, the rotational parameter ($\theta$) is equal to, or constructively equal to, the horizontal scaling factor ($s_x$), which is equal to, or constructively equal to, the vertical scaling factor ($s_y$), which is equal to, or constructively equal to, zero ($\theta=s_x=s_y=0$), which is equivalent to a translational optical flow model.

In some implementations, the rotational parameter (0) is equal to, or constructively equal to, zero ($\theta=0$), which is equivalent to the four-parameter scaling refinement model.

In some implementations, the rotational parameter ($\theta$) is equal to, or constructively equal to, zero ($\theta=0$) and the horizontal scaling factor ($s_x$) is equal to, or constructively equal to, the vertical scaling factor ($s_y$) ($s_x=s_y$), which is equivalent to the three-parameter scaling refinement model.

In some implementations, the scaling parameters may be equal, or constructively equal, ($s_x=s_y=S$), such that a four-parameter refinement model may be used, or solved, to obtain a rotational parameter, a scaling parameter, and two translation parameters.

For obtaining the forward refined prediction block (i=0) and the backward refined prediction block (i=1), the warped motion may be expressed as the following:

$$x'_w = (1 + sd_i)x - (\theta d_i)y + t_x d_i, \quad \text{[Equation 10]}$$

$$y'_w = (\theta d_i)x + (1 + sd_i)y + t_y d_i. \quad \text{[Equation 11]}$$

In some implementations, obtaining the refined motion vectors includes obtaining, as a first value ($sd_i$), a result of multiplying the scaling parameter(S) by a temporal distance ($d_i$) between a reference frame (i=0 for obtaining a forward refined motion vector, i=1 for obtaining a backward refined motion vector) indicated by the reference frame data and the current frame. In some implementations, obtaining the refined motion vectors includes obtaining, as a second value ($\theta d_i$), a result of multiplying the rotational parameter ($\theta$) by the temporal distance ($d_i$). In some implementations, obtaining the refined motion vectors includes obtaining, as a horizontal component ($X_w'$) of the refined motion vector, a result of adding a result of multiplying a horizontal translational motion value ($t_x$) and the temporal distance ($d_i$) ($t_x d_i$) and a result of subtracting a result of multiplying a vertical location value (y) indicating a vertical location of the current block in the current frame by the second value ($\theta d_i$)($\theta d_i$)y) from a result of multiplying a horizontal location value (x) indicating a horizontal location of the current block in the current frame by a result of adding one to the first value ($ad_i$)((1+$ad_i$)x) ((1+$sd_i$)x−($\theta d_i$) y+$t_x d_i$). In some implementations, obtaining the refined motion vectors includes obtaining, as a vertical component ($y_w'$) of the refined motion vector, a result of adding a result of multiplying a vertical translational motion value ($t_y$) and the temporal distance ($d_i$) ($t_y d_i$), a result of multiplying the horizontal location value (x) by the second value ($\theta d_i$)(($\theta d_i$)x), and a result of multiplying the vertical location value (y) by the result of adding one to the first value ($sd_i$)(1+$sd_i$)(($\theta d_i$)x+(1+$sd_i$) y+$t_y d_i$).

In some implementations, the warp matrix is defined for prediction from past to future, such that the warped parameters may be used for forward reference, wherein the warped parameters for backward reference are unavailable. To obtain the warped parameters for backward reference, an inverse warp matrix may be obtained.

For example, the forward warp matrix (A), and the corresponding inverse matrix ($A^{-1}$), wherein $1/(1+\alpha t)$ is approximated as $1-\alpha t$ to avoid division operations, may be expressed as the following:

$$A = \begin{pmatrix} (1+\alpha t)\cos(t\phi) & -(1+\alpha t)\sin(t\phi) & t \cdot t_x \\ (1+\alpha t)\sin(t\phi) & (1+\alpha t)\cos(t\phi) & t \cdot t_y \\ 0 & 0 & 1 \end{pmatrix}, \quad \text{[Equation 12]}$$

$$A^{-1} \approx A' = \begin{pmatrix} (1-\alpha t)\cos(t\phi) & (1-\alpha t)\sin(t\phi) & t(1-\alpha t)t'_x \\ -(1-\alpha t)\sin(t\phi) & (1-\alpha t)\cos(t\phi) & t(1-\alpha t)t'_y \\ 0 & 0 & 1 \end{pmatrix},$$

$$t'_x = \cos(t\phi)t_x + \sin(t\phi)t_y,$$

$$t'_y = \sin(t\phi)t_x - \cos(t\phi)t_y.$$

A mapping for warped prediction may be obtained by a matrix operation, which may be expressed as the following:

$$\begin{bmatrix} x'_w \\ y'_w \\ 1 \end{bmatrix} = A * \begin{bmatrix} x \\ y \\ 1 \end{bmatrix}.$$

Based on the above closed form solution and with cos (t)~=1 and sin(t)~=t, the backward translational parameters are $d_i(1-\alpha d_i)(t_x+d_i\theta t_y)$ in the horizontal (x) direction and $d_i(1-\alpha d_i)(d_i\theta t_x-t_y)$ in the vertical (y) direction. Division operations are avoided.

In some implementations, obtaining the warped motion for the forward refined prediction block (i=0) and the backward refined prediction block (i=1) may be expressed as shown in Equations 10 and 11.

In some implementations, obtaining the warped motion for the forward refined prediction block (i=0) may be expressed as shown in Equations 10 and 11 and obtaining the warped motion for the backward refined prediction block (i=1) may be expressed as shown in the following:

$$x'_w = (1 + \alpha d_1)x - (\theta d_1)y + d_1(1 - \alpha d_1)(t_x + d_1\theta t_y), \quad \text{[Equation 13]}$$

$$y'_w = (\theta d_1)x + (1 + \alpha d_1)y + d_1(1 - \alpha d_1)(d_1\theta t_x - t_y). \quad \text{[Equation 14]}$$

In some implementations, obtaining the backward refined motion vector includes obtaining, as a third value ($\alpha d_1$), a result of multiplying the scaling parameter(S) by a second temporal distance ($d_1$) between a backward reference frame indicated by the reference frame data and the current frame. In some implementations, obtaining the backward refined motion vector includes obtaining, as a fourth value ($\theta d_1$), a result of multiplying the rotational parameter ($\theta$) by the second temporal distance ($d_1$). In some implementations, obtaining the backward refined motion vector includes obtaining, as a horizontal component ($x_w'$) of a backward refined motion vector, a result of adding a result of multiplying the second temporal distance ($d_1$), a result of subtracting the third value ($\alpha d_1$) from one, and a result of adding the horizontal translational motion value ($t_x$) and a result of multiplying the second temporal distance ($d_1$), the rotational parameter ($\theta$), and the vertical translational motion value ($t_y$), and a result of subtracting a result of multiplying the vertical location value (y) by the fourth value ($\theta d_1$) from a result of multiplying the horizontal location value (x) by a result of adding one to the third value ($\alpha d_1$). In some implementations, obtaining the backward refined motion vector includes obtaining, as a vertical component ($y_w'$) of the backward refined motion vector, a result of adding a result of multiplying the second temporal distance ($d_1$), the result of subtracting the third value ($\alpha d_1$) from one, and a result of subtracting the vertical translational motion value ($t_y$) from a result of multiplying the second temporal distance ($d_1$), the rotational parameter ($\theta$), and the horizontal translational motion value ($t_x$), a result of multiplying the horizontal location value (x) by the fourth value, and a result of multiplying the vertical location value (y) by a result of adding one to the third value ($\alpha d_1$).

In some implementations, obtaining the warped motion for the forward refined prediction block (i=0) may be expressed as shown in Equations 13 and 14 and obtaining the warped motion for the backward refined prediction block (i=1) may be expressed as shown in Equations 10 and 11.

For implementations that omit, or exclude, obtaining, or otherwise using, subblock based refined translational motion vectors (at 990), determining the refined prediction blocks (at 980) includes obtaining, as the refined prediction block, a combination, such as an average, of the forward refined prediction block and the backward refined prediction block.

In some implementations, subblock based refined translational motion vectors are obtained (at 990).

Optical flow refinement includes bilateral, or compound, matching that uses two predicted blocks and respective corresponding coarse compound motion vectors and uses optical flow derivation to obtain fine (or refined) motion vectors, such as on a per 8×8 or 4×4 subblock of a prediction unit or block. In some implementations, the optical flow refinement includes two translational motion parameters. In some implementations, the optical flow refinement includes three or four warped motion parameters and two translational motion parameters, such as in the four-parameter scaling refinement model, the three-parameter scaling refinement model, the four-parameter rotational refinement model, or the rotational and scaling refinement model, as described herein.

In some implementations, coding may be performed on a per-prediction unit basis wherein the encoder determines whether to use subblock based refinement or block-based warped, such as affine, refinement. The determination whether to subblock based refinement or block-based warped, such as affine, refinement includes the encoder searching, such as by comparing candidates obtained in accordance with subblock based refinement with candidates obtained in accordance with block-based warped, such as affine, refinement, which has relatively high resource utilization and complexity and utilizes bandwidth for signaling data in the encoded bitstream.

In some implementations, Coding using motion refinement using bilateral, or compound, matching with a warped motion model, such as decoding including motion refinement using bilateral, or compound, matching with one or more warped refinement models 900 or encoding including motion refinement using bilateral, or compound, matching with one or more warped refinement models (not expressly shown), including obtaining subblock based refined translational motion vectors, results in similar, or improved, prediction quality, lower complexity, lower resource (processing) utilization, and non-increased bandwidth utilization relative to coding that includes determining whether to use subblock based refinement or block-based warped, such as affine, refinement.

Coding using motion refinement using bilateral, or compound, matching with a warped motion model, such as decoding including motion refinement using bilateral, or compound, matching with one or more warped refinement models 900 or encoding including motion refinement using bilateral, or compound, matching with one or more warped refinement models (not expressly shown) includes block, as opposed to subblock, based warped, or affine, refinement with subblock based translational refinement to improve coding efficiency. In some implementations, as described herein, encoder complexity, and resource utilization, may be low, relative to an encoder searching, or evaluating, using two or more models.

Obtaining subblock based refined translational motion vectors (at 990) includes obtaining subblock translational parameters on a per 8×8 or 4×4 subblock basis using optical flow refinement based on the forward refined prediction block and the backward refined prediction block. The optical flow refinement may be similar to the refinement with optical flow 800 shown in FIG. 8, except as is described herein or as is otherwise clear from context.

Coding using motion refinement using bilateral, or compound, matching with a warped motion model, such as decoding including motion refinement using bilateral, or compound, matching with one or more warped refinement models 900 or encoding including motion refinement using bilateral, or compound, matching with one or more warped refinement models (not expressly shown) includes obtaining a combination of the block, or prediction unit, based warped motion parameters and the subblock based translational parameters for subblock prediction refinement.

Obtaining subblock based refined translational motion vectors (at 990) is described with reference to using the four-parameter rotational and scaling model with respect to Equations 10 and 11, wherein the rotational and scaling refinement model is a four-parameter warped model. In some implementations, Equations 13 and 14 may be used. In some implementations, other warped motion refinement models may be used.

Obtaining subblock based refined translational motion vectors (at 990) includes using optical flow motion refinement to obtain optical flow refined translational motion vectors ($\Delta MV_{\Omega_k}$) for respective 4×4 or 8×8 subblocks, wherein $\Omega_k$ indicates subblock k. The optical flow motion refinement is similar to the translational optical flow refinement shown in FIG. 8, except as is described herein or as is otherwise clear from context.

For implementations that include obtaining, or otherwise using, subblock based refined translational motion vectors (at 990), obtaining subblock based refined translational motion vectors (at 990) includes using warped prediction to obtain the refined prediction block (refined prediction pixels) based on the block, or prediction unit, based warped motion parameters combined with the subblock based refined translational motion vectors.

For a subblock ($\Omega_k$), such as the such as the top-left subblock 812 shown in FIG. 8, warped prediction is performed with block, or prediction unit, based rotation, scaling, and translational parameters (obtained at 980) and with subblock based offsets based on the subblock translational parameters (obtained at 990). The refined prediction block is obtained using an average of warped prediction with i=0 (forward) and with i=1 (backward).

In an example, using the four-parameter rotational and scaling model, the warped prediction for subblock ($\Omega_k$) is based on a rotation angle ($d_i\theta$), a scaling factor ($1+d_is$), and translational parameters ($MVx_i+\Delta MVx_{\Omega_k}+d_it_x$) (in the horizontal (x) direction) and ($MVy_i+\Delta MVy_{\Omega_k}+d_it_y$) (in the vertical (y) direction), for i=0 and i=1.

In some implementations, obtaining, or otherwise using, subblock based refined translational motion vectors (at 990) includes subblock prediction using warped prediction and omitting using translational prediction. Using subblock prediction using warped prediction includes defined restrictions on the warped parameters to perform low complexity warped prediction using a two-step interpolation filter. In some implementations, the derived warped parameters may be inconsistent, or non-compliant, with the defined restrictions, translational motion may be obtained, such as computed, at block center per 4×4 region based on the warped, or affine, model, and translational prediction is used on a per 4×4 subblock basis.

In some implementations, obtaining, or otherwise using, subblock based refined translational motion vectors (at 990) includes omitting subblock based refinement for chroma blocks, wherein the chroma blocks use the warped, or affine, parameters obtained for the corresponding collocated luma block.

In some implementations, the optical flow refinement is performed on a per 8×8 luma subblock basis for luma block sizes greater than 8×8, or on a per 4×4 luma subblock basis for 8×8 luma block size.

In some implementations, for luma block sizes greater than 8×8, the combined model-based refinement is performed on a per 8×8 luma subblock basis, and the on a per 4×4 chroma subblock basis for collocated chroma blocks.

In some implementations, for 8×8 luma block size, the combined (block based (at 980) and subblock based (at 990)) refinement is performed on a per 4×4 luma subblock basis, and then performed for the corresponding 4×4 chroma block (as opposed to subblock), such as in accordance with a restriction that warped prediction is performed at the 4×4 level, wherein an average of the refined motion vectors of the four subblocks is obtained and combined with the warped, or affine, model to obtained the warped prediction.

In some implementations, obtaining the gradients (at 970) includes extending the pixel range for deriving the translational parameters. For 8×8 subblocks, a 10×10 pixel region may be used, wherein the subblock is extended by one pixel per edge or boundary, such as wherein corresponding gradient values are available. For 4×4 subblocks, a 6×6 pixel region may be used, wherein the subblock is extended by one pixel per edge or boundary, such as wherein corresponding gradient values are available. Using extended pixel regions may improve coding gains for using the warped, or affine, model in combination with the subblock based translational model, relative to using subblock size-based pixel regions.

Coding using motion refinement using bilateral, or compound, matching with a warped motion model, such as decoding including motion refinement using bilateral, or compound, matching with one or more warped refinement models 900 or encoding including motion refinement using bilateral, or compound, matching with one or more warped refinement models (not expressly shown) includes obtaining, or generating, reconstructed block data (at 930) using the refined prediction block, the refined motion vectors, or both, such as by adding the refined prediction block to decoded residual block data.

In encoding including motion refinement using bilateral, or compound, matching with one or more warped refinement models, the encoder obtains, or generates, residual block data by subtracting the refined prediction block from the corresponding coarse block (not expressly shown n FIG. 9) and obtains, or generates, reconstructed block data (at 930) using the refined prediction block, the refined motion vectors, or both, such as by adding the refined prediction block to decoded residual block data.

Coding using motion refinement using bilateral, or compound, matching with a warped motion model, such as decoding including motion refinement using bilateral, or compound, matching with one or more warped refinement models 900 or encoding including motion refinement using bilateral, or compound, matching with one or more warped refinement models (not expressly shown) includes the decoder including the reconstructed block data in reconstructed frame data for the current frame and outputting the reconstructed frame data (at 940). For example, the decoder may output the reconstructed frame for presentation to a user. In another example, the decoder may store the reconstructed frame data for subsequently coding another frame.

In encoding including motion refinement using bilateral, or compound, matching with one or more warped refinement models, the encoder includes the reconstructed block data in reconstructed frame data for the current frame and stores the reconstructed frame data for subsequently coding another frame.

Figure 10:
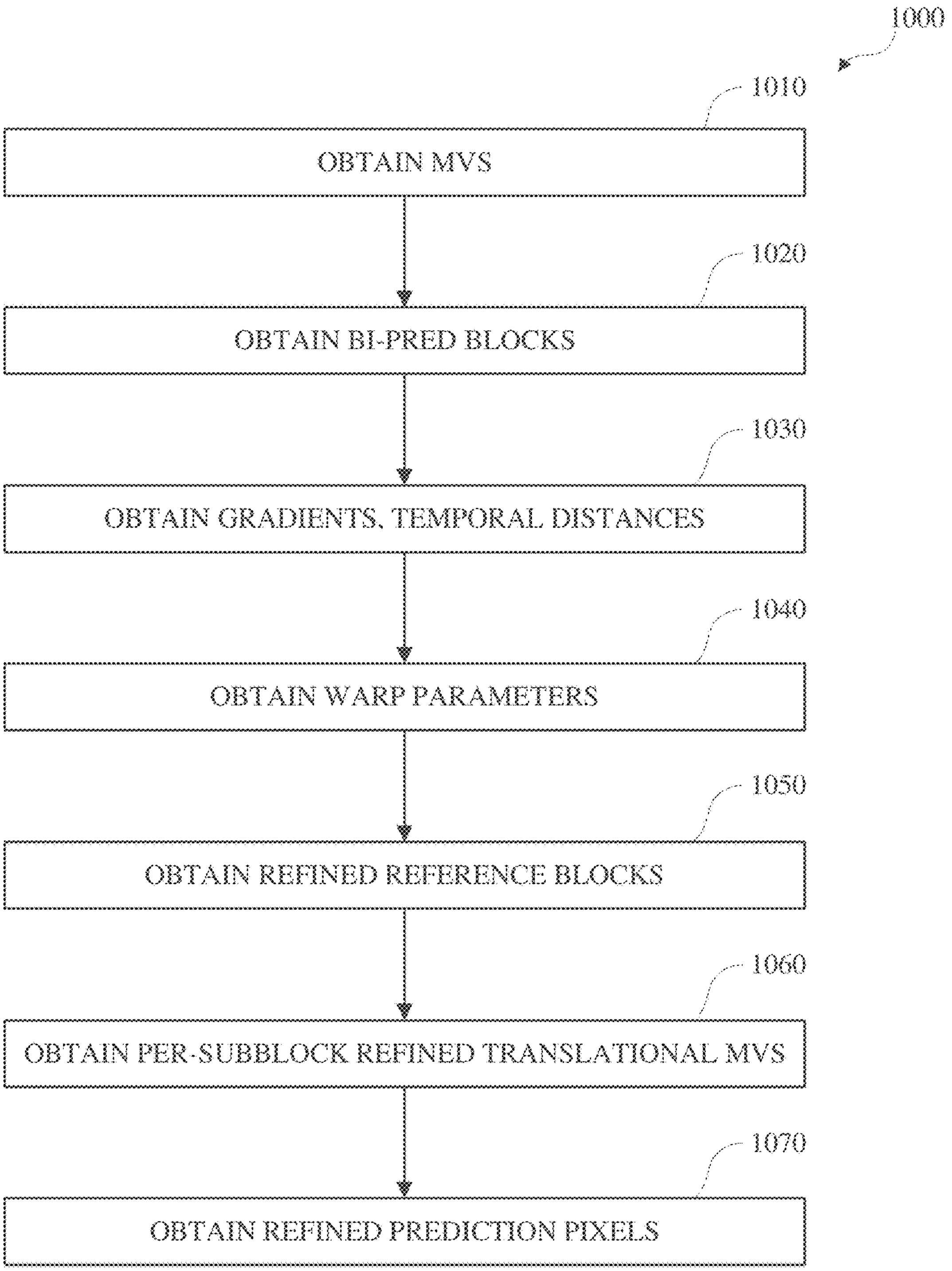
FIG. 10 is a process flow diagram of an example of prediction refinement with combined block based warped and subblock based translational models.

FIG. 10 is a process flow diagram of an example of prediction refinement with combined block based warped and subblock based translational models 1000. In some implementations, obtaining a refined prediction block (at 920) in FIG. 9 may include prediction refinement with combined block based warped and subblock based translational models 1000 as shown in FIG. 10.

Optical flow refinement includes bilateral matching that uses two predicted blocks and respective corresponding coarse compound motion vectors (MVs) and uses optical flow derivation to obtain fine (or refined) motion vectors, such as on a per 8×8 or 4×4 subblock of a prediction unit. In some implementations, the optical flow refinement includes two translational motion parameters. In some implementations, the optical flow refinement includes three or four warped motion parameters and two translational motion parameters, such as in the four-parameter scaling model, the three-parameter scaling model, the four-parameter rotation model, or the rotation and scaling model, as described herein.

In some implementations, decoding including motion refinement using bilateral, or compound, matching with one or more warped refinement models, such as shown (at 900) in FIG. 9, may be performed on a per-prediction unit basis, which includes an encoder determination whether to use subblock based optical flow refinement or warped, such as affine, motion-based refinement. The determination whether to use subblock based optical flow refinement or warped, such as affine, motion-based refinement includes the encoder searching, such as by comparing candidates, which has relatively high resource utilization and complexity and utilizes bandwidth for signaling data in the encoded bitstream.

In some implementations, as described herein, subblock based optical flow refinement and warped, such as affine, motion-based refinement are combined, which results in similar, or improved, prediction quality, lower complexity, lower resource (processing) utilization, and without increased bandwidth utilization. The combination includes block, as opposed to subblock, base warped, or affine, model refinement with subblock based optical flow refinement to improve inter coding efficiency. In some implementations, as described herein, encoder complexity, and resource utilization, may be low, relative to an encoder searching, or evaluating, using two or more models.

The prediction refinement with combined block based warped and subblock based translational models 1000 described herein includes using predicted blocks based on course motion vectors to derive warped motion parameters on a prediction block (unit), as opposed to subblock, basis, such as using three or four parameter models as described herein. Two compound predicted blocks are re-generated using warped prediction based on the derived warp motion parameters. Subsequently, with the refined predicted bocks, optical flow refinement is used to obtain translational parameters on a per 8×8 or 4×4 subblock basis. Using the subblock translational parameters, inter prediction is refined on a per-subblock basis, based on the combination of the derive warped motion parameters (block based) and the subblock based translational parameters, such that a combination of block based warped motion refinement and subblock based translational refinement is used.

The prediction refinement with combined block based warped and subblock based translational models 1000 described herein includes using the four-parameter rotation and scaling model, as described herein. Although, for simplicity, the prediction refinement with combined block based warped and subblock based translational models 1000 described herein is described as using the rotation and scaling model is described with respect to Equations 10 and 11, in some implementations, Equations 13 and 14 may be used.

Prediction refinement with combined block based warped and subblock based translational models 1000 includes obtaining motion vectors (at 1010), obtaining bi-directional predicted (bi-pred) blocks (at 1020), obtaining gradients and temporal distances (at 1030), obtaining warp parameters (at 1040), obtaining refined reference blocks (at 1050), obtaining per-subblock refined translational motion vectors (MVs) (at 1060), and obtaining refined prediction pixels (at 1070).

Motion vectors, such as two motion vectors (MV0 and MV1), are obtained (at 1010) as described herein.

Bi-directional predicted (bi-pred) blocks are obtained (at 1020) using the two motion vectors (MV0 and MV1) (obtained at 1010) to obtain bi-directional predicted blocks (P0 and P1) (at 1010). Obtaining the bi-directional predicted blocks (P0 and P1) includes motion compensation using two motion vectors (MV0 and MV1) (obtained at 1010).

Numerical gradients and temporal distances are obtained (at 1030).

Obtaining the numerical gradients (at 1030) includes obtaining, such as by computing, numerical gradients (Gx0, Gy0) of the first bi-directional predicted block (P0) and numerical gradients (Gx1, Gy1) of the second bi-directional predicted block (P1).

Obtaining the temporal distances (at 1030) includes obtaining, such as calculating, a first temporal distance d0 and a second temporal distance d1 from the reference frames to the current frame, wherein d>0 represents forward reference (from the past in display order), and d<0 represents backward references.

Obtaining warp parameters (at 1040) includes using the numerical gradients (Gx0, Gy0) of the first bi-directional predicted block (P0) and numerical gradients (Gx1, Gy1) of the second bi-directional predicted block (P1), the first temporal distance d0 and the second temporal distance d1, and pixel coordinates of the current block to obtain warp, or affine, parameters, such as θ, α, tx, and tx, with reference to the four-parameter rotation and scaling model described herein.

Obtaining refined reference blocks (at 1050) includes obtaining, such as by re-generating, compound reference blocks, such as two compound reference blocks ((P0' and P1'), using warped prediction based on the motion vectors (MV0 and MV1) (obtained at 1010), the temporal distances (d0 and d1) (obtained at 1030), and the warp, or affine, parameters (obtained at 1040), for the pixel locations (x, y) in the current block and for i=0 and i=1 which may be expressed as the following:

$$x' = \cos(\theta d_i)(1+\alpha_x d_i)x - \sin(\theta d_i)(1+\alpha_y d_i)y + t_x d_i, \quad \text{[Equation 15]}$$

$$y' = \sin(\theta d_i)(1+\alpha_x d_i)x + \cos(\theta d_i)(1+\alpha_y d_i)y + t_y d_i. \quad \text{[Equation 16]}$$

In some implementations, refined predicted block may be obtained cos(x)=1 and sin(x)=x, which may be expressed as the following:

$$x' = (1+\alpha_x d_i)x - \theta d_i(1+\alpha_y d_i)y + t_x d_i, \quad \text{[Equation 17]}$$

$$y' = \theta d_i(1+\alpha_x d_i)x + (1+\alpha_y d_i)y + t_y d_i. \quad \text{[Equation 18]}$$

Obtaining per-subblock refined translational motion vectors (MVs) (at 1060) includes optical flow motion refinement to obtain optical flow refined translational motion vectors ($\Delta MV_{\Omega_k}$) for respective 4×4 or 8×8 subblocks, wherein $\Omega_k$ indicates subblock k.

Obtaining refined prediction pixels (at 1070) includes using warped prediction to obtain the refined prediction pixels based on the warp parameters (obtained at 1040) combined with the refined translational motion vectors (obtained at 1060).

For a subblock ($\Omega_k$) warped prediction is performed with rotation and scaling parameters (obtained at 1040) and (per-block) translational parameters (obtained at 1040) with per-subblock offsets based on the subblock translational parameters (obtained at 1060). A prediction block is obtained using an average of warped prediction with i=0 and with i=1.

In an example, using the four-parameter rotation and scaling model, as described herein, the warped prediction for subblock ($\Omega_k$) is based on a rotation angle ($d_i\theta$), a scaling factor ($1+d_i\alpha$), and translational parameters ($MVX_i+\Delta MVx_{\Omega_k}+d_i t_x$) (in the horizontal (x) direction) and ($MVy_i+\Delta MVy_{\Omega_k}+d_i t_y$) (in the vertical (y) direction), for i=0 and i=1.

In some implementations, prediction refinement with combined block based warped and subblock based translational models 1000 includes subblock prediction (at 1060) using warp prediction and omitting using translational prediction. Using subblock prediction (at 1060) using warp prediction includes defined restrictions on the warp parameters to perform low complexity warped prediction using a two-step interpolation filter. In some implementations, the derived warp parameters may be inconsistent, or non-compliant, with the defined restrictions, translational motion may be obtained, such as computed, at block center per 4×4 region based on the warped, or affine, model, and translational prediction is used on a per 4×4 subblock basis.

In some implementations, prediction refinement with combined block based warped and subblock based translational models 1000 includes omitting subblock based refinement for chroma blocks, wherein the chroma blocks use the warped, or affine, parameters obtained for the corresponding collocated luma block.

In some implementations, the optical flow refinement is performed on a per 8×8 luma subblock basis for luma block sizes greater than 8×8, or on a per 4×4 luma subblock basis for 8×8 luma block size.

In some implementations, for luma block sizes greater than 8×8, the combined model-based refinement is performed on a per 8×8 luma subblock basis, and the on a per 4×4 chroma subblock basis for collocated chroma blocks.

In some implementations, for 8×8 luma block size, the combined refinement is performed a per 4×4 luma subblock basis, and then performed for the corresponding 4×4 chroma block (as opposed to subblock), such as in accordance with a restriction that warped prediction is performed at the 4×4 level, wherein an average of the refined motion vectors of the four subblocks (obtained at 1030) is obtained and combined with the warped, or affine, model to obtained the warped prediction.

In some implementations, obtaining the numerical gradients (at 1030) includes extending the pixel range for deriving the translational parameters. For 8×8 subblocks, a 10×10 pixel region may be used, wherein the subblock is extended by one pixel per edge or boundary, such as wherein corresponding gradient values are available. For 4×4 subblocks, a 6×6 pixel region may be used, wherein the subblock is extended by one pixel per edge or boundary, such as wherein corresponding gradient values are available. Using extended pixel regions may improve coding gains for using the warped, or affine, model in combination with the subblock based translational model, relative to using subblock size-based pixel regions.

Motion refinement using bilateral, or compound, matching with one or more warped refinement models may include using an optical flow approach to obtain, or derive, warped, or affine, motion parameters, such as three or four warped, or affine, motion parameters, for refining a compound inter-predicted block, such as shown in FIG. 9 or FIG. 9 and FIG. 10, which includes dynamic range handing in the inverse autocorrelation.

For a bw×bh block, having a block width (bw) and a block heigh (bh), predicted blocks (p0 and p1) are obtained. Numerical gradients (gx0, gy0, gx1, gy1), having size bw×bh, corresponding to the predicted blocks, are obtained. Warped, or affine, parameters, such as four warped, or affine, parameters, are obtained, or derived, which includes obtaining, or deriving, an autocorrelation matrix (A), a crosscorrelation vector (b), or both. The forms of the autocorrelation matrix (A) and the crosscorrelation vector (b) may be expressed as the following:

$$T_x(i,j) = d_0 * gx0[i][j] - d_1 * gx1[i][j],$$

$$T_y(i,j) = d_0 * gy0[i][j] - d_1 * gy1[i][j],$$

$$x(j) = j - \frac{bw}{2} + 1,\ y(i) = i - \frac{by}{2} + 1,$$

$$a(i,j) = \begin{pmatrix} -y(i) * T_x(i,j) + x(j) * T_y(i,j), \\ x(j) * T_x(i,j) + y(i) * T_y(i,j),\ T_x(i,j),\ T_y(i,j) \end{pmatrix}^T,$$

$$d(i,j) = p0[i][j] - p1[i][j],$$

$$A = \sum_{i,j} a(i,j) * a(i,j)^T,\ b = \sum_{i,j} a(i,j) * d(i,j).$$

Obtaining, filling, or deriving, the autocorrelation matrix (A) and the crosscorrelation vector (b), wherein x and y indicate coordinates with respect to the block center, may be expressed as the following:

[Expression 1]

```
Tx[bh][bw]={0}
Ty[bh][bw]={0}
for i=0:bh−1
  for j=0:bw−1
    Tx[i][j]=d0*gx0[i][j]−d1*gx1[i][j]
    Ty[i][j]=d0*gy0[i][j]−d1*gy1[i][j]
    d[i][j]=p0[i][j]−p1[i][j]
A[4][4]={{0,0,0,0},{0,0,0,0},{0,0,0,0},{0,0,0,0}}
b[4]={0,0,0,0}
for i=0:bh−1
  for j=0:bw−1
    x=j−bw/2+1
    y=i−bh/2+1
    a[0]= −Tx[i][j]*y + Ty[i][j]*x
    a[1]= Tx[i][j]*x + Ty[i][j]*y
    a[2]= Tx[i][j]
    a[3]= Ty[i][j]
    for s=0:3
        for t=0:3
          A[s][t]+=a[s]*a[t]
    for s=0:3
      b[s]+=a[s]*d
```

Obtaining, or deriving, the four warped, or affine, parameters (x[4]) includes obtaining, or deriving, the four warped, or affine, parameters (x[4]) using a linear solver in accordance with, based on, or with respect to, the autocorrelation matrix (A) and the crosscorrelation vector (b), which may be expressed as x-linear_solver(A,b). The linear solver obtains, or solves, a least squares solution for min $|A*x-b|^2$, such as using Cramer's rule, which includes obtaining, such as computing, an inverse determinant of the autocorrelation matrix (invDetA), which is an inverse of a determinant of the autocorrelation matrix (det(A)), and obtaining, such as computing, an adjusted determinant of the autocorrelation matrix (detAj[i]), wherein the adjusted determinant of the autocorrelation matrix (detAj[i]) is a determinant of a matrix obtained from the autocorrelation matrix (A) by replacing a column (column i) by the crosscorrelation vector (b). Obtaining, or deriving, the four warped, or affine, parameters may include obtaining respective warped, or affine, parameters using the inverse determinant of the autocorrelation matrix (invDetA) and the adjusted determinant of the autocorrelation matrix (detAj[i]), which may be expressed as x[i]=detAj[i]*invDetA.

In some implementations, the dynamic range of intermediate results may be relatively large, such as, in part, because the block size (bw×bh) may be in the range from 8×8 to 256×256, or larger, such that the range of x and y coordinates may be as large as [−64, 64]. For larger block sizes, gradient values of more pixels may be aggregated. Large coordinates x and y may be included in a[0] and a[1] and may be omitted from a[2] and a[3], such that the dynamic range of an element in the first two rows and first two columns of the autocorrelation matrix (A), such as A[0][1], may be larger than that of an element in the last two rows or columns, such as A[4][3].

In some implementations, the dynamic range of intermediate results may be relatively large, such as, in part, because the per-pixel bit depth may be eight (8), ten (10), twelve (12), or larger.

In some implementations, the dynamic range of intermediate results may be relatively large, such as, in part, because the absolute values of the temporal distances (do and d1) may be large, corresponding to parameters, such as lag in frames.

In some implementations, the dynamic range of intermediate results may be relatively large, such as, in part, because the linear solver (linear_solver) may obtain, such as calculate, a series of products of elements in the autocorrelation matrix (A) and the crosscorrelation vector (b), which may increase the dynamic range.

A large dynamic range may correspond with, or result in, overflow.

To avoid overflow, the dynamic range of intermediate results may be adjusted, such as reduced, such as to avoid a large loss of numerical precision, which may include a dynamic range adjustment for the autocorrelation matrix (A) to obtain a dynamic range adjusted autocorrelation matrix, a dynamic range adjusted crosscorrelation vector, or both.

In some implementations, the dynamic range adjustment for the autocorrelation matrix (A) is column and row specific, wherein criteria are based on block size and maximum absolute values of Tx(i, j), Ty(i, j), and d(i, j).

The dynamic range adjustment includes, for elements in a column (column t) or a row (row t) of the autocorrelation matrix (A) that involve a scaling factor of coordinates (x and y), such as the elements obtained using a[0], a[1], or both, as shown in Expression 2, a right shift by a number, count, or cardinality (K) of bits (coords_bits or right shift amount) is performed for filling the corresponding elements of the autocorrelation matrix (A). In a corresponding linear solver (linear_solver_range_adjusted), a left shift by the number, count, or cardinality (K) of bits is performed to the adjusted determinant of the autocorrelation matrix (detAj[t]) prior to obtaining x(t) as detAj[t]/detA. The number, count, or cardinality (K) of bits is defined based on the binary logarithm (log 2) of the maximum among the block width and the block height (max(bw, bh)). For example, as shown in Expression 2 below, obtaining the number, count, or cardinality (K) of bits (coords_bits) may be expressed as $$K = \max\left(0, \frac{\log_2(bw) + \log_2(bh)}{2}\right).$$

The dynamic range adjustment includes obtaining, such as computing, the maximum values (M) of Tx(i, j), Ty(i, j), and d(i, j). The binary logarithm ($\log_2$) of the maximum values (M) multiplied by a function of the block width (bw) and the block height (bh) may be greater than a defined threshold, and a right shift of a number, count, or cardinality (L) of bits (grad_bits or adaptive dynamic range reduction parameter) may be applied for filling the respective elements of the autocorrelation matrix (A). For example, as shown in Expression 2 below, obtaining the number, count, or cardinality (L) of bits (grad_bits) may be expressed as $L=\max(0, 2\log_2 M+\log_2(bw)+\log_2(bh)+\log_2(\max(bw,bh)-\tau)$, wherein $\tau$ is a defined, such as experimentally tuned to optimize numerical stability, threshold (grad_bits_thr), such as thirty-two.

Obtaining, filling, or deriving, the dynamic range adjusted autocorrelation matrix (A) and the dynamic range adjusted crosscorrelation vector (b), wherein x and y indicate coordinates with respect to the block center, may be expressed as the following:

[Expression 2]

```
max_el=0
Tx[bh][bw]={0}
Ty[bh][bw]={0}
for i=0:bh−1
  for j=0:bw−1
    Tx[i][j]=d0*gx0[i][j]−d1*gx1[i][j]
    Ty[i][j]=d0*gy0[i][j]−d1*gy1[i][j]
    d[i][j]=p0[i][j]−p1[i][j]
    max_el = max({max_el, Tx[i][j], Ty[i][j], d[i][j]})
bw_log2=ceil(log2(bw))
bh_log2=ceil(log2(bh))
max_el_log2=ceil(log2(max_el))
grad_bits_thr=32
grad_bits=max(0,
max_el_log2*2+bh_log2+bw_log2+max(bh_log2,bw_log2)−
grad_bits_thr)
coords_bits=max(0, (bh_log2+bw_log2)>>1)
A[4][4] = {{0,0,0,0},{0,0,0,0},{0,0,0,0},{0,0,0,0}}
b[4] = {0,0,0,0}
for i=0:bh−1
  for j=0:bw−1
    x=j−bw/2+1
    y=i−bh/2+1
    a[0]= (−Tx[i][j]*y + Ty[i][j]*x)>>coords_bits
    a[1]= (Tx[i][j]*x + Ty[i][j]*y)>> coords_bits
    a[2]= Tx[i][j]
    a[3]= Ty[i][j]
    for s=0:3
      for t=0:3
        A[s][t] += (a[s]*a[t])>>grad_bits
    for s=0:3
      b[s] += (a[s]*d[i][j])>>grad_bits
det_bits = {coords_bits, coords_bits, 0, 0}
```

Obtaining, or deriving, the four warped, or affine, parameters (x[4]) includes obtaining, or deriving, the four warped, or affine, parameters (x[4]) using a range adjusting linear solver (linear_solver_range_adjusted) in accordance with, based on, or with respect to, the dynamic range adjusted autocorrelation matrix (A), the dynamic range adjusted crosscorrelation vector (b), or both, obtained as shown in Expression 2, using a range adjustment vector (det_bits), which may be expressed as x=_linear_solver_range_adjusted(A, b, det_bits). The linear solver (linear_solver_range_adjusted) obtains, or solves, a least squares solution for min $|A*x-b|^2$, such as using Cramer's rule, which includes obtaining, such as computing, an inverse determinant of the dynamic range adjusted autocorrelation matrix (invDetA), which is an inverse of a determinant of the dynamic range adjusted autocorrelation matrix (det(A)), and obtaining, such as computing, an adjusted determinant of the dynamic range adjusted autocorrelation matrix (detAj[i]), wherein the adjusted determinant of the dynamic range adjusted autocorrelation matrix (detAj[i]) is a determinant of a matrix obtained from the dynamic range adjusted autocorrelation matrix (A) by replacing a column (column i) by the dynamic range adjusted crosscorrelation vector (b). Obtaining, or deriving, the four warped, or affine, parameters may include obtaining respective warped, or affine, parameters using the inverse determinant of the dynamic range adjusted autocorrelation matrix (invDetA) and the adjusted determinant of the dynamic range adjusted autocorrelation matrix (detAj[i]), which may be expressed as x[i]=detAj[i]<<det_bits[i])*invDetA.

The right shift amount parameter (coords_bits) is used to reduce the dynamic range of a[0] and a[1] to compensate for the scaling factor of x and y wherein the block size is large. The right shifts are reversed, or canceled out, by the left shifts with det_bits in the range adjusted linear solver (linear_solver_range_adjusted). The parameter grad_bits adaptively reduces the dynamic range of the dynamic range adjusted autocorrelation matrix (A) based on the block size and the potential maximum element (as estimated by max_el). The threshold grad_bits_thr may be defined, such as experimentally tuned, to obtain optimal numerical stability. The dynamic range increase associated with relatively high bit depth, such as bit depth of ten (10) or twelve, rather than bit depth of eight (8), may be addressed by the estimate of the maximum element (max_el).

As indicated in Expression 2, obtaining, filling, or deriving, the dynamic range adjusted autocorrelation matrix (A), the dynamic range adjusted crosscorrelation vector (b), or both, includes obtaining a minimum integer value that is greater than a binary logarithm of the block width (bw_log 2=ceil(log 2(bw))).

As indicated in Expression 2, obtaining, filling, or deriving, the dynamic range adjusted autocorrelation matrix (A), the dynamic range adjusted crosscorrelation vector (b), or both, includes obtaining a minimum integer value that is greater than a binary logarithm of the block height (bh_log 2=ceil(log 2(bh))).

As indicated in Expression 2, obtaining, filling, or deriving, the dynamic range adjusted autocorrelation matrix (A), the dynamic range adjusted crosscorrelation vector (b), or both, includes obtaining, as the estimate of the maximum element (max_el), a maximum value among a current value of the estimate of the maximum element (max_el), a gradient based horizontal matrix variable ($T_x$[i][j]), a gradient based vertical matrix variable ($T_y$[i][j]), and a prediction difference matrix variable (d[i][j]), (max_el=max({max_el, $T_x$[i][j], $T_y$[i][j], d[i][j]})). In some implementations, the estimate of the maximum element (max_el) is obtained iteratively, wherein, in a first iteration, the current value of the estimate of the maximum element (max_el) is zero (max_el=0), and in iterations other than the first iteration the current value of the estimate of the maximum element (max_el) is obtained from a previous iteration.

As indicated in Expression 2, obtaining, filling, or deriving, the dynamic range adjusted autocorrelation matrix (A), the dynamic range adjusted crosscorrelation vector (b), or both, includes obtaining, as a binary logarithm value for the estimate of the maximum element, a minimum integer value that is greater than a binary logarithm of the estimate of the maximum element (max_el_log 2−ceil(log 2(max_el))).

As indicated in Expression 2, obtaining, filling, or deriving, the dynamic range adjusted autocorrelation matrix (A), the dynamic range adjusted crosscorrelation vector (b), or both, includes obtaining, as a threshold (grad_bits_thr), a defined value, such as thirty-two as shown.

As indicated in Expression 2, obtaining, filling, or deriving, the dynamic range adjusted autocorrelation matrix (A), the dynamic range adjusted crosscorrelation vector (b), or both, includes obtaining, as the adaptive dynamic range reduction parameter (grad_bits), a maximum value among zero (0) and a sum of a result of multiplying the binary logarithm value for the estimate of the maximum element by two (max_el_log 2*2), the minimum integer value that is greater than the binary logarithm of the block height (bw_log 2), the minimum integer value that is greater than the binary logarithm of the block width (bw_log 2), and a result of subtracting the threshold (grad_bits_thr) from a maximum among the minimum integer value that is greater than the binary logarithm of the block height and the minimum integer value that is greater than the binary logarithm of the block width (max (bw_log 2, bw_log 2)), (grad_bits=max(0, max_el_log 2*2+bh_log 2+bw_log 2+max(bh_log 2,bw_log 2)−grad_bits_thr)).

As indicated in Expression 2, obtaining, filling, or deriving, the dynamic range adjusted autocorrelation matrix (A), the dynamic range adjusted crosscorrelation vector (b), or both, includes obtaining, as the right shift amount (coords_bits), a maximum among zero and a result of right shifting by one a sum of the minimum integer value that is greater than the binary logarithm of the block height and the minimum integer value that is greater than the binary logarithm of the block width.

As indicated in Expression 2, obtaining, filling, or deriving, the dynamic range adjusted autocorrelation matrix (A), the dynamic range adjusted crosscorrelation vector (b), or both, includes obtaining matrix population values.

As indicated in Expression 2, obtaining, filling, or deriving, the matrix population values includes obtaining, as a first matrix population value (a[0]), a result of right shifting, by the right shift amount (coords_bits), a sum of a product of a negative of the gradient based horizontal matrix variable ($T_x$[i][j]) and a vertical location with respect to the center of the current block (y) and a product of the gradient based vertical matrix variable ($T_y$[i][j]) and a horizontal location with respect to the center of the current block (x), which may be expressed as a[0]=(−Tx[i][j]*y+Ty[i][j]*x)>>coords_bits.

As indicated in Expression 2, obtaining, filling, or deriving, the matrix population values includes obtaining, as a second matrix population value (a[1]), a result of right shifting, by the right shift amount (coords_bits), a sum of a product of the gradient based horizontal matrix variable ($T_x$[i][j]) and the horizontal location with respect to the center of the current block (x) and a product of the gradient based vertical matrix variable ($T_y$[i][j]) and the vertical location with respect to the center of the current block (y), which may be expressed as a[0]=(Tx[i][j]*x+Ty[i][j]*y)>>coords_bits.

As indicated in Expression 2, obtaining, filling, or deriving, the matrix population values includes obtaining, as a third matrix population value (a[2]), the gradient based horizontal matrix variable ($T_x$[i][j]).

As indicated in Expression 2, obtaining, filling, or deriving, the matrix population values includes obtaining, as a fourth matrix population value (a[3]), the gradient based vertical matrix variable ($T_y$[i][j]).

As indicated in Expression 2, obtaining, filling, or deriving, the dynamic range adjusted autocorrelation matrix (A) includes obtaining a value of the dynamic range adjusted autocorrelation matrix (A[s][t]). As indicated in Expression 2, obtaining, filling, or deriving the value of the dynamic range adjusted autocorrelation matrix (A[s][t]) includes adding, to the value of the dynamic range adjusted autocorrelation matrix (A[s][t]), a result of right shifting, by the adaptive dynamic range reduction parameter (grad_bits), a product of two of the matrix population values, which is expressed as shown in Expression 2 as A[s][t]+=(a[s]*a[t])>>grad_bits.

As indicated in Expression 2, obtaining, filling, or deriving, the dynamic range adjusted crosscorrelation vector (b) includes obtaining a value of the dynamic range adjusted crosscorrelation vector (b[s]). As indicated in Expression 2, obtaining, filling, or deriving the value of the dynamic range adjusted crosscorrelation vector (b[s]) includes adding, to the value of the dynamic range adjusted crosscorrelation vector (b[s]), a result of right shifting, by the adaptive dynamic range reduction parameter (grad_bits), a product of a matrix population value (a[s]) corresponding to the value of the dynamic range adjusted crosscorrelation vector (b[s]) and the prediction difference matrix variable (d[i][j]), which is expressed as shown in Expression 2 as b[s]+=(a[s]*d[i][j])>>grad_bits.

As indicated in Expression 2, obtaining, filling, or deriving, the dynamic range adjusted autocorrelation matrix (A), the dynamic range adjusted crosscorrelation vector (b), or both, includes obtaining the range adjustment vector (det_bits) including, as a first value, the right shift amount (coords_bits), as a second value, the right shift amount (coords_bits), as a third value, zero (0), and as a fourth value, zero (0), which is expressed as shown in Expression 2 as det_bits={coords_bits, coords_bits, 0, 0}.

Obtaining, or deriving, the four warped, or affine, parameters (x[4]) includes obtaining, or deriving, the four warped, or affine, parameters (x[4]) using the range adjusting linear solver (linear_solver_range_adjusted) in accordance with, based on, or with respect to, the dynamic range adjusted autocorrelation matrix (A), the dynamic range adjusted crosscorrelation vector (b), and the range adjustment vector (det_bits), which may be expressed as x=linear_solver_range_adjusted (A, b, det_bits).

The approach described herein is generally applicable, such as for higher dimensional inverse autocorrelation, such as for block sizes larger than 256×256 and bit depth greater than twelve (12).

The dynamic range handing in the inverse autocorrelation described herein may be used in other contexts, such as contexts other than motion refinement.

As used herein, the terms "optimal", "optimized", "optimization", or other forms thereof, are relative to a respective context and are not indicative of absolute theoretic optimization unless expressly specified herein.

As used herein, the term "set" indicates a distinguishable collection or grouping of zero or more distinct elements or members that may be represented as a one-dimensional array or vector, except as expressly described herein or otherwise clear from context.

The words "example" or "exemplary" are used herein to mean serving as an example, instance, or illustration. Any aspect or design described herein as "example" or "exemplary" not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. As used herein, the terms "determine" and "identify", or any variations thereof, includes selecting, ascertaining, computing, looking up, receiving, determining, establishing, obtaining, or otherwise identifying or determining in any manner whatsoever using one or more of the devices shown in FIG. 1.

Further, for simplicity of explanation, although the figures and descriptions herein may include sequences or series of steps or stages, elements of the methods disclosed herein can occur in various orders and/or concurrently. Additionally, elements of the methods disclosed herein may occur with other elements not explicitly presented and described herein. Furthermore, one or more elements of the methods described herein may be omitted from implementations of methods in accordance with the disclosed subject matter.

The implementations of the transmitting computing and communication device 100A and/or the receiving computing and communication device 100B (and the algorithms, methods, instructions, etc. stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of the transmitting computing and communication device 100A and the receiving computing and communication device 100B do not necessarily have to be implemented in the same manner.

Further, in one implementation, for example, the transmitting computing and communication device 100A or the receiving computing and communication device 100B can be implemented using a computer program that, when executed, carries out any of the respective methods, algorithms and/or instructions described herein. In addition, or alternatively, for example, a special purpose computer/processor can be utilized which can contain specialized hardware for carrying out any of the methods, algorithms, or instructions described herein.

The transmitting computing and communication device 100A and receiving computing and communication device 100B can, for example, be implemented on computers in a real-time video system. Alternatively, the transmitting computing and communication device 100A can be implemented on a server and the receiving computing and communication device 100B can be implemented on a device separate from the server, such as a hand-held communications device. In this instance, the transmitting computing and communication device 100A can encode content using an encoder 400 into an encoded video signal and transmit the encoded video signal to the communications device. In turn, the communications device can then decode the encoded video signal using a decoder 500. Alternatively, the communications device can decode content stored locally on the communications device, for example, content that was not transmitted by the transmitting computing and communication device 100A. Other suitable transmitting computing and communication device 100A and receiving computing and communication device 100B implementation schemes are available. For example, the receiving computing and communication device 100B can be a generally stationary personal computer rather than a portable communications device and/or a device including an encoder 400 may also include a decoder 500.

Further, all or a portion of implementations can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

It will be appreciated that aspects can be implemented in any convenient form. For example, aspects may be implemented by appropriate computer programs which may be carried on appropriate carrier media which may be tangible carrier media (e.g., disks) or intangible carrier media (e.g., communications signals). Aspects may also be implemented using suitable apparatus which may take the form of programmable computers running computer programs arranged to implement the methods and/or techniques disclosed herein. Aspects can be combined such that features described in the context of one aspect may be implemented in another aspect.

The above-described implementations have been described in order to allow easy understanding of the application are not limiting. On the contrary, the application covers various modifications and equivalent arrangements included within the scope of the appended claims, which scope is to be accorded the broadest interpretation so as to encompass all such modifications and equivalent structure as is permitted under the law.

What is claimed is:

1. A method comprising:
generating reconstructed block data by decoding a current block of a current frame from an encoded bitstream, wherein decoding the current block includes:
obtaining a refined prediction block for decoding the current block using bilateral matching, wherein obtaining the refined prediction block includes:
obtaining a refinement model from available warped refinement models, wherein the available warped refinement models include a four-parameter scaling refinement model, a three-parameter scaling refinement model, and a four- parameter rotational refinement model;
obtaining refined motion vectors using the refinement model and previously obtained reference frame data absent data expressly indicating the refined motion vectors in the encoded bitstream, wherein obtaining the refined motion vectors includes using a dynamic range adjusted autocorrelation matrix; and
generating refined prediction block data using the refined motion vectors;
generating reconstructed block data using the refined prediction block data;
including the reconstructed block data in reconstructed frame data for the current frame; and
outputting the reconstructed frame data.

2. The method of claim 1, wherein using the dynamic range adjusted autocorrelation matrix includes deriving the dynamic range adjusted autocorrelation matrix.

3. The method of claim 2, wherein deriving the dynamic range adjusted autocorrelation matrix includes:
obtaining a right shift amount in accordance with a block height of the current block and a block width of the current block.

4. The method of claim 3, wherein obtaining the right shift amount includes:
obtaining the right shift amount in accordance with a binary logarithm of a maximum among the block height and the block width.

5. The method of claim 3, wherein obtaining the right shift amount includes:
obtaining, as the right shift amount, a maximum among zero and a result of right shifting by one a sum of a minimum integer value that is greater than a binary logarithm of the block height and a minimum integer value that is greater than a binary logarithm of the block width.

6. The method of claim 5, wherein deriving the dynamic range adjusted autocorrelation matrix includes:
adjusting a dynamic range of a portion of the dynamic range adjusted autocorrelation matrix in accordance with the right shift amount.

7. The method of claim 6, wherein deriving the dynamic range adjusted autocorrelation matrix includes:
obtaining, as an estimate of a maximum element, a maximum value among a current value of the estimate of the maximum element, a gradient based horizontal matrix variable, a gradient based vertical matrix variable, and a prediction difference matrix variable;
obtaining, as a binary logarithm value for the estimate of the maximum element, a minimum integer value that is greater than a binary logarithm of the estimate of the maximum element;
obtaining, as an adaptive dynamic range reduction parameter, a maximum value among zero and a sum of a result of multiplying the binary logarithm value for the estimate of the maximum element by two, the minimum integer value that is greater than the binary logarithm of the block height, the minimum integer value that is greater than the binary logarithm of the block width, and a result of subtracting a defined threshold from a maximum among the minimum integer value that is greater than the binary logarithm of the block height and the minimum integer value that is greater than the binary logarithm of the block width; and
adjusting the dynamic range of the dynamic range adjusted autocorrelation matrix in accordance with the adaptive dynamic range reduction parameter.

8. A method comprising:
generating reconstructed block data by decoding a current block of a current frame from an encoded bitstream, wherein decoding the current block includes:
obtaining a refined prediction block for decoding the current block using bilateral matching, wherein obtaining the refined prediction block includes:
obtaining refined motion vectors for decoding the current block using bilateral matching, wherein obtaining the refined motion vectors includes obtaining the refined motion vectors using a rotational and scaling refinement model and previously obtained reference frame data absent data expressly indicating the refined motion vectors in the encoded bitstream, wherein obtaining the refined motion vectors includes using a dynamic range adjusted autocorrelation matrix; and generating refined prediction block data using the refined motion vectors;

generating reconstructed block data using the refined prediction block data;

including the reconstructed block data in reconstructed frame data for the current frame; and outputting the reconstructed frame data.

9. The method of claim 8, wherein using the dynamic range adjusted autocorrelation matrix includes deriving the dynamic range adjusted autocorrelation matrix.

10. The method of claim 9, wherein deriving the dynamic range adjusted autocorrelation matrix includes:

obtaining a right shift amount in accordance with a block height of the current block and a block width of the current block.

11. The method of claim 10, wherein obtaining the right shift amount includes:

obtaining the right shift amount in accordance with a binary logarithm of a maximum among the block height and the block width.

12. The method of claim 10, wherein obtaining the right shift amount includes:

obtaining, as the right shift amount, a maximum among zero and a result of right shifting by one a sum of a minimum integer value that is greater than a binary logarithm of the block height and a minimum integer value that is greater than a binary logarithm of the block width.

13. The method of claim 12, wherein deriving the dynamic range adjusted autocorrelation matrix includes:

adjusting a dynamic range of a portion of the dynamic range adjusted autocorrelation matrix in accordance with the right shift amount.

14. The method of claim 13, wherein deriving the dynamic range adjusted autocorrelation matrix includes:

obtaining, as an estimate of a maximum element, a maximum value among a current value of the estimate of the maximum element, a gradient based horizontal matrix variable, a gradient based vertical matrix variable, and a prediction difference matrix variable;

obtaining, as a binary logarithm value for the estimate of the maximum element, a minimum integer value that is greater than a binary logarithm of the estimate of the maximum element;

obtaining, as an adaptive dynamic range reduction parameter, a maximum value among zero and a sum of a result of multiplying the binary logarithm value for the estimate of the maximum element by two, the minimum integer value that is greater than the binary logarithm of the block height, the minimum integer value that is greater than the binary logarithm of the block width, and a result of subtracting a defined threshold from a maximum among the minimum integer value that is greater than the binary logarithm of the block height and the minimum integer value that is greater than the binary logarithm of the block width; and adjusting the dynamic range of the dynamic range adjusted autocorrelation matrix in accordance with the adaptive dynamic range reduction parameter.

15. A method comprising:

generating reconstructed block data by decoding a current block of a current frame from an encoded bitstream, wherein decoding the current block includes:

obtaining a refined prediction block for decoding the current block using bilateral matching, wherein obtaining the refined prediction block includes:

obtaining a warped refinement model from available warped refinement models, wherein the available warped refinement models include a four-parameter scaling refinement model, a three-parameter scaling refinement model, a four-parameter rotational refinement model, and a four-parameter rotational and scaling model;

obtaining refined motion vectors using the warped refinement model and previously obtained reference frame data absent data expressly indicating the refined motion vectors in the encoded bitstream, wherein obtaining the refined motion vectors includes obtaining a combination of block-based warped motion parameters obtained using the warped refinement model and subblock-based translational motion parameters as the refined motion vectors, wherein obtaining the refined motion vectors includes using a dynamic range adjusted autocorrelation matrix; and generating refined prediction block data for the refined prediction block using the refined motion vectors;

generating reconstructed block data using the refined prediction block data;

including the reconstructed block data in reconstructed frame data for the current frame; and outputting the reconstructed frame data.

16. The method of claim 15, wherein using the dynamic range adjusted autocorrelation matrix includes deriving the dynamic range adjusted autocorrelation matrix.

17. The method of claim 16, wherein deriving the dynamic range adjusted autocorrelation matrix includes:

obtaining a right shift amount in accordance with a block height of the current block and a block width of the current block.

18. The method of claim 17, wherein using the dynamic range adjusted autocorrelation matrix includes deriving the dynamic range adjusted autocorrelation matrix, wherein deriving the dynamic range adjusted autocorrelation matrix includes:

obtaining, as the right shift amount, a maximum among zero and a result of right shifting by one a sum of a minimum integer value that is greater than a binary logarithm of the block height and a minimum integer value that is greater than a binary logarithm of the block width.

19. The method of claim 18, wherein deriving the dynamic range adjusted autocorrelation matrix includes:

adjusting a dynamic range of a portion of the dynamic range adjusted autocorrelation matrix in accordance with the right shift amount.

20. The method of claim 19, wherein deriving the dynamic range adjusted autocorrelation matrix includes:

obtaining, as an estimate of a maximum element, a maximum value among a current value of the estimate of the maximum element, a gradient based horizontal matrix variable, a gradient based vertical matrix variable, and a prediction difference matrix variable;

obtaining, as a binary logarithm value for the estimate of the maximum element, a minimum integer value that is greater than a binary logarithm of the estimate of the maximum element;

obtaining, as an adaptive dynamic range reduction parameter, a maximum value among zero and a sum of a result of multiplying the binary logarithm value for the estimate of the maximum element by two, the minimum integer value that is greater than the binary logarithm of the block height, the minimum integer value that is greater than the binary logarithm of the block width, and a result of subtracting a defined threshold from a maximum among the minimum integer value that is greater than the binary logarithm of the block height and the minimum integer value that is greater than the binary logarithm of the block width; and adjusting the dynamic range of the dynamic range adjusted autocorrelation matrix in accordance with the adaptive dynamic range reduction parameter.

* * * * *